(12) United States Patent
Shoshan et al.

(10) Patent No.: US 9,536,282 B2
(45) Date of Patent: *Jan. 3, 2017

(54) METHOD AND APPARATUS FOR CONTROLLING SPATIAL RESOLUTION IN A COMPUTER SYSTEM

(71) Applicant: Lucidlogix Technologies Ltd., Natanya (IL)

(72) Inventors: Yoel Shoshan, Haifa (IL); Albert Shalumov, Karmiel (IL)

(73) Assignee: LUCIDLOGIX TECHNOLOGIES LTD., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,976

(22) Filed: Dec. 2, 2015

(65) Prior Publication Data

US 2016/0203578 A1    Jul. 14, 2016

Related U.S. Application Data

(63) Continuation-in-part of application No. 14/596,309, filed on Jan. 14, 2015.

(51) Int. Cl.
*G06F 17/00* (2006.01)
*G06T 3/40* (2006.01)

(52) U.S. Cl.
CPC ......... *G06T 3/4007* (2013.01); *G06T 2210/36* (2013.01)

(58) Field of Classification Search
None
See application file for complete search history.

(56) References Cited

U.S. PATENT DOCUMENTS

2010/0171759 A1* 7/2010 Nickolov .................. G06T 3/40
345/634
2013/0207951 A1* 8/2013 Didyk ....................... G06T 3/40
345/207

OTHER PUBLICATIONS

Clarberg, Petrik et al., "AMFS: Adaptive Multi-Frequency Shading for Future Graphics Processors", Intel Corporation, Lund University, Aug. 2014, 12 pages.
Brady, Adam et al., "genBRDF: Discovering New Analytic BRDFs with Genetic Programming", University of Virginia, The College of William & Mary, 2014, 11 pages.
He, Yong et al., "Extending the Graphics Pipeline with Adaptive, Multi-Rate Shading", Carnegie Mellon University, 12 pages.

* cited by examiner

*Primary Examiner* — Martin Mushambo
(74) *Attorney, Agent, or Firm* — Isus Intellectual Property

(57) ABSTRACT

A computer implemented method of producing output pixels for display in a graphics system, in which the steps include performing rendering operations on one or more pixels, wherein the rendering operations includes the steps of using a POI analyzer to determine one or more of: (a) whether a pixel is a POI or a pixel not of interest (PNOI); (b) selecting different resolutions for a POI and for a PNOI.

7 Claims, 24 Drawing Sheets

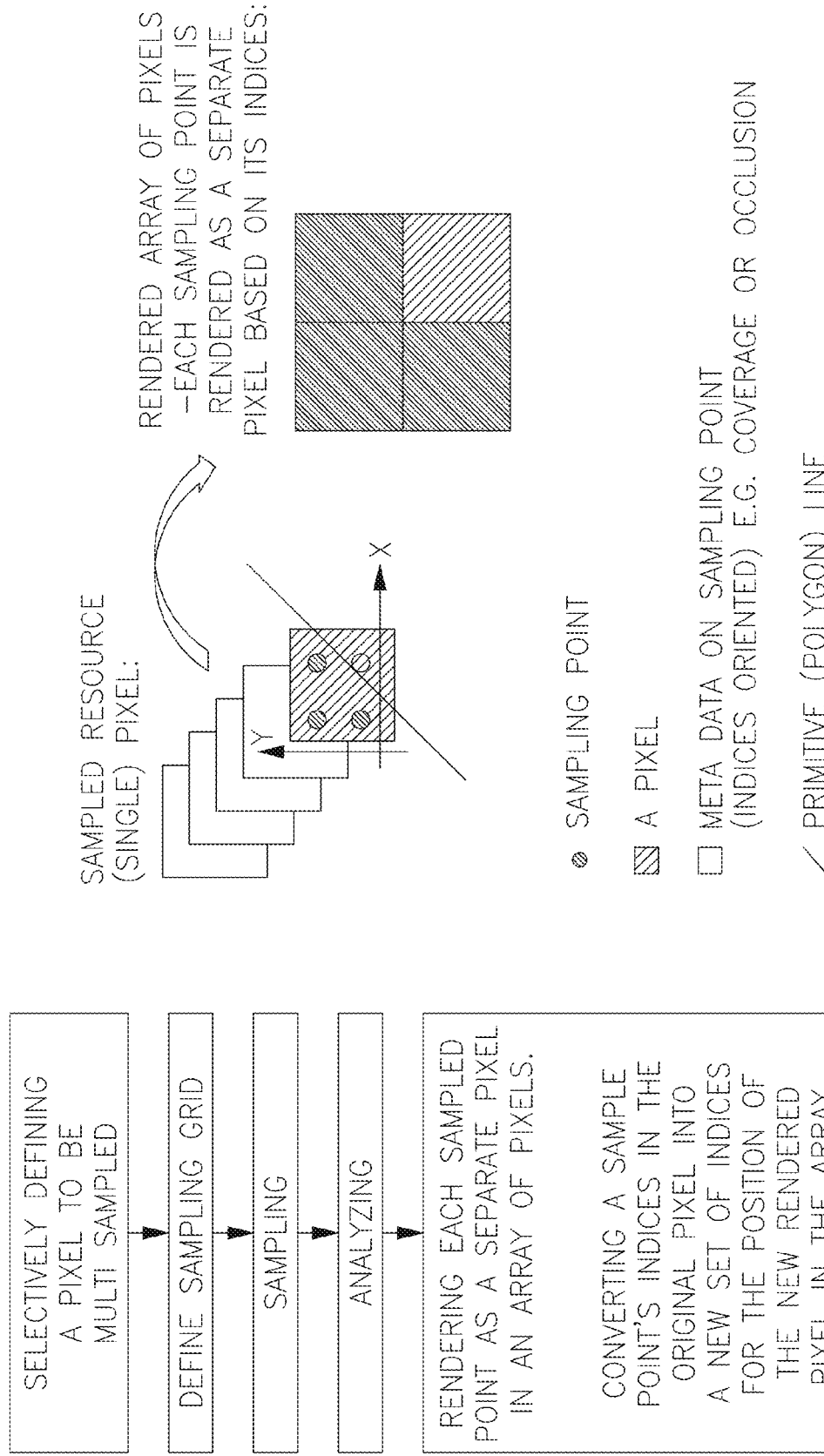

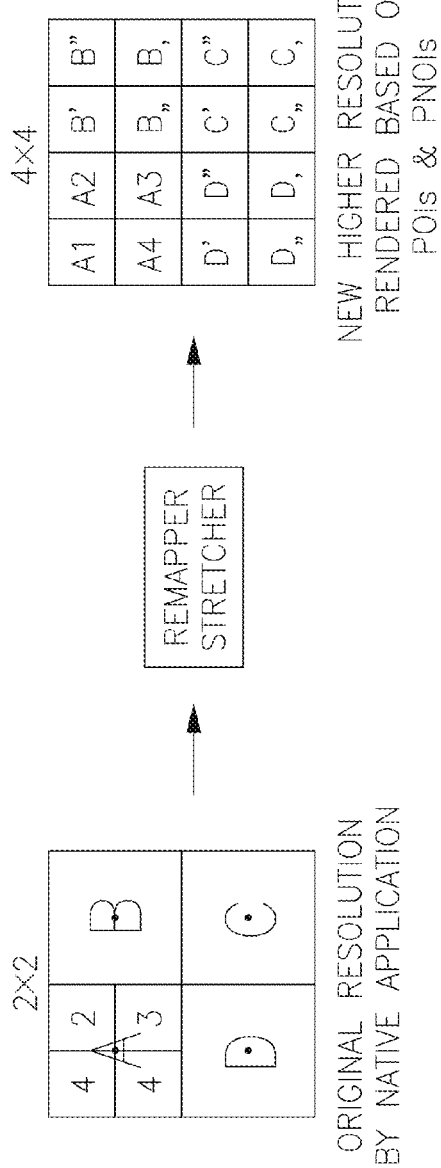
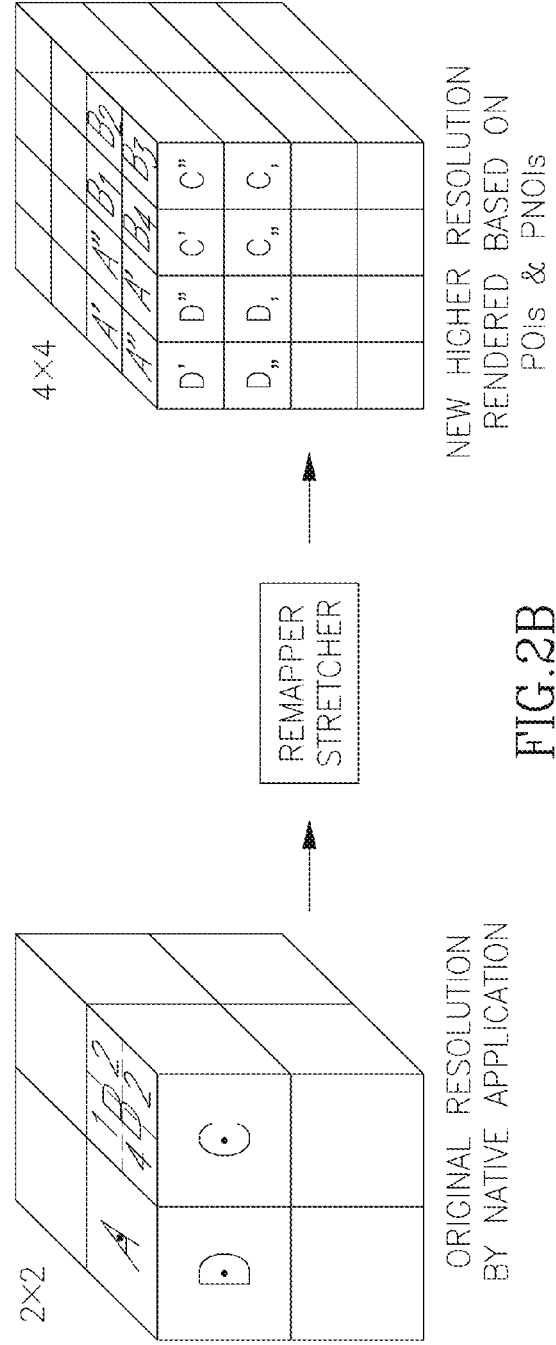
FIG.2A
FIG.2B

○ FIRST SAMPLING GRID-COLLECTING DATA DEFINE
  WHETHER PIXEL SHOULD BE MULTI SAMPLED

⊙ SECOND SAMPLING GRID-COLLECTING
  META DATA FROM RENDERING PURPOSES

▨ A PIXEL

☐ META DATA ON SAMPLING POINT (INDICES ORIENTED)
  E.G. COVERAGE OR OCCLUSION

╱ PRIMITIVE (POLYGON) LINE

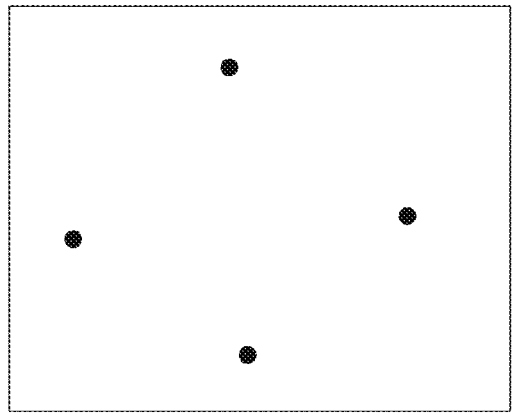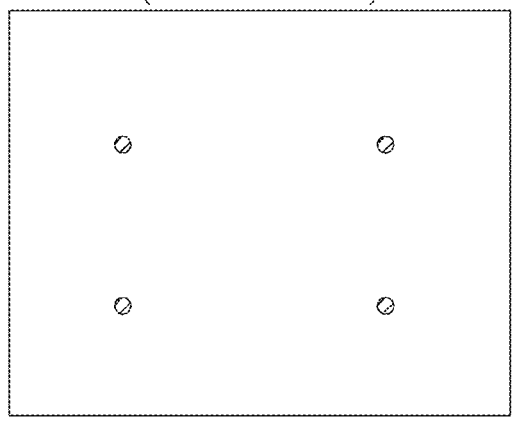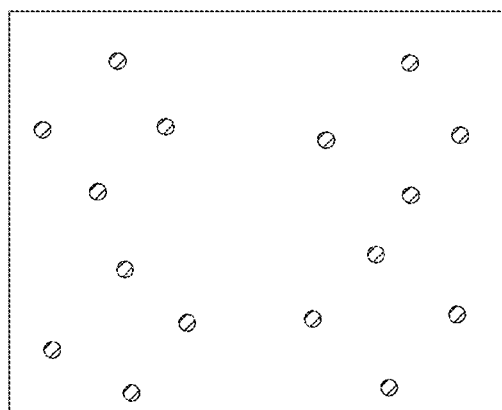
FIG.3A

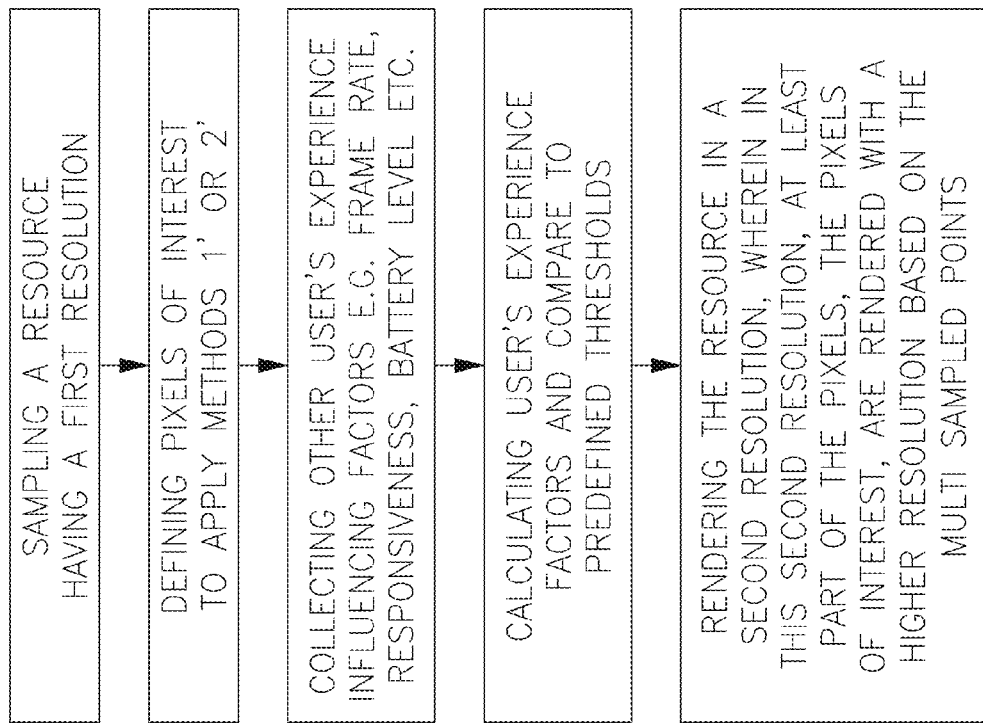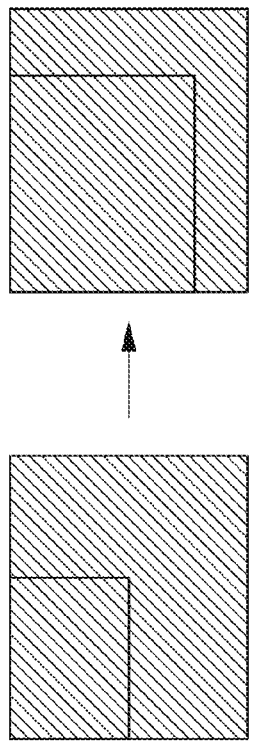
FIG. 5

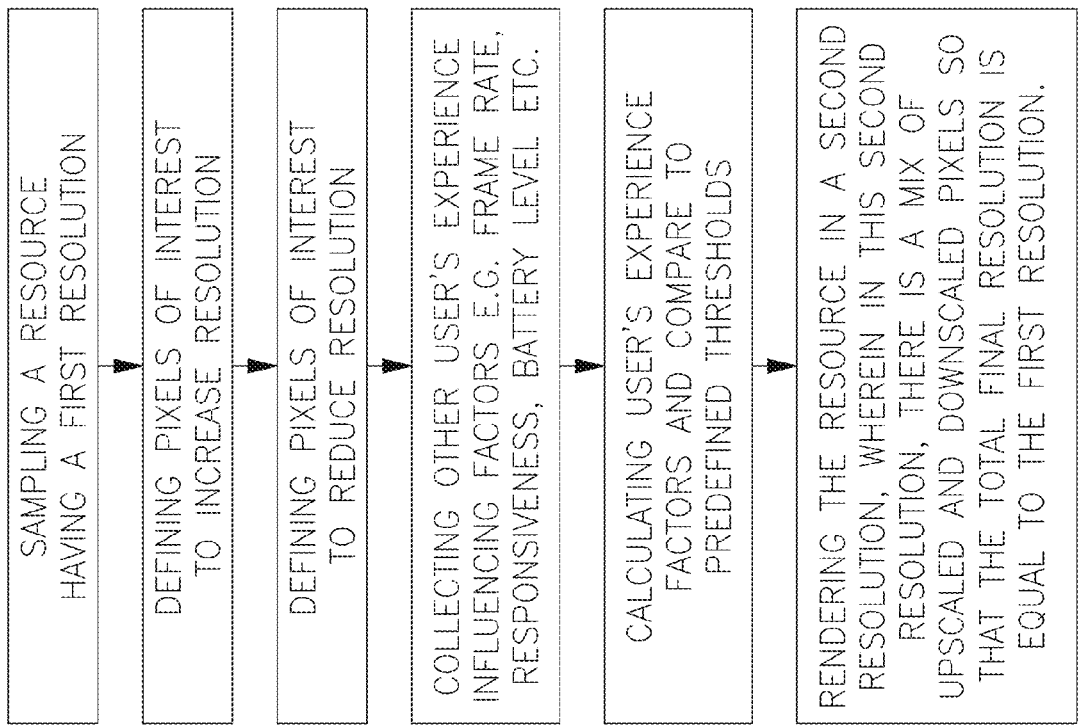
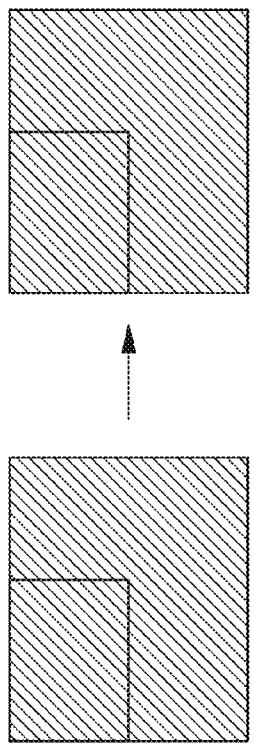
FIG.6

METHOD AND APPARATUS FOR CONTROLLING SPATIAL RESOLUTION IN A COMPUTER SYSTEM

RELATED APPLICATIONS

This application is a continuation-in-part application of U.S. patent application Ser. No. 14/596,309, filed Jan. 14, 2015, the complete disclosure of which is hereby incorporated by reference in its entirety.

This application is related to US Publication Number 2013/0176322, entitled "Application-Transparent Resolution Control by Way of Command Stream Interception", the entirety of which is herein incorporated by reference.

FIELD OF THE INVENTION

The present invention relates to enhancing a user's experience in connection with the resolution of images in imaging applications.

BACKGROUND OF THE PRESENT INVENTION

US publication number 2013/0176322, entitled "Application-Transparent Resolution Control by Way of Command Stream Interception" (hereinafter "Resolution Control") discloses an independent software program that is configured to run and intervene seamlessly on the fly between a graphical native application which is run on a CPU and a GPU which renders graphical commands in order to create an image on a screen or off screen buffers. This may be configured as shown in FIG. 4B of the aforesaid Resolution Control application wherein the Dynamic Resolution Modifier is interposed between the CPU and the GPU. Absent such a software program, the GPU will render an image based on the input of stream of commands and shaders as were generated by the native application from the CPU.

By interposing the Dynamic Resolution Modifier between the CPU and the GPU, it receives a stream of commands and shaders which were generated by the native application as its input instead of the native flow of the 3d API towards the GPU. It then intercepts and analyzes them and based on different considerations such as user experience, heat level, frame rate, power consumption or battery level, may change some or all of these commands and/or shaders, as graphically shown on the right hand side of the drawing in FIG. 4B. A modified stream of commands and/or shaders may be generated by a spatial resolution controller which is then sent to the GPU for rendering instead of the original commands and shaders which were generated by the native application from the CPU. In this way, the software program dynamically, in real time, controls and modifies the resolution of an image on a frame by frame, resource by resource basis. As such, it has the capability to sample a resource in one resolution and write that resource into a different resolution.

It is known to those skilled in the art that reading and writing may be done from/to a single resource or from/to multiple resources. A resolution reduction of a resource may be done by modifying the API commands, which for the sake of this entire application may be 3D or 2D, to render only part of that resource. As the state of the native application, hardware or other resources of the system on which the native application runs change, the resolution of a frame or a resource may be scaled up again. A resource which has been modified by a dynamic resolution modifier no longer carries with it the original resolution as generated previously by the native application. Up scaling such modified resources requires proper sampling and rendering techniques in order to keep user experience above a predefined threshold. This is critical to 2D Heads Up Displays (HUD) resources as well as others.

Also, in the prior art, anti-aliasing (AA) mechanisms such as super sampling (SSAA) and multi sampling (MSAA) are known. Such mechanisms, as known to those skilled in the art, sample at least one spot in a resource's pixel and calculate the visibility of such pixel in the rendered resource based on coverage and occlusion criteria of a primitive polygon it has to render. Primitive polygons such as triangles or lines inherently have discontinuities. This leads to unavoidable aliasing, irrespective of the sampling rate chosen. AA software creates a grid of sampling points to be sampled in a resource's pixel. Such a grid may include 1, 2, 3, 4, 5, 6, 7, 8 or more sampling points per pixel. Moreover, the spatial distribution of such sampling points may be along the main axis x and y of a pixel or at any rotated angle. For example, a technique known as MSAAX4 may practice a grid of 4 sampling points per pixel that are rotated at 45 degrees angle to the main axis of the pixel. Statistics show that better sensitivity to detect geometrical edges is achieved by using a rotated grid. In practice, in this example, 4 samples are taken per pixel. This data set of 4 points is then used in order to render this sampled pixel. Any pixel in the original resource is rendered into a new pixel in the new resource. However, note that there is no change of a final resource resolution. This is a simple pixel to pixel conversion. The only purpose of this mechanism is to reduce aliasing. The way aliasing is reduced is by averaging the sampled data points of each pixel. Once data points are averaged, the raw sampled data disappears and there is no further use for this data. SSMA increases the system processing costs of rendering and it is hardly used today. MSAA, on the other hand, requires less system resources and is widely used for anti-aliasing purposes. An article which discusses MSAA in detail is "A Quick Overview of MSA", by Matt Pettineo, published Oct. 24, 2012.

SUMMARY OF THE INVENTION

In one aspect, a computer implemented method of producing output pixels for a graphics system includes the steps of receiving one or more input pixels from the graphics system; performing rendering operations on the one or more pixels, wherein the rendering including the steps of: selecting one or more pixels of interest the resolution of which are to be increased; defining a sampling grid or a sampling orientation; multi sampling the one or more pixels of interest having a first resolution and multiple sampling points; collecting information from each sampled point; storing information from each sampled point as a virtual pixel; defining one or more pixels the resolution of which are one of remain the same as received from the graphics system or the resolution of which are to be reduced; and, rendering pixels of interest in a higher resolution than the their first resolution by rendering each virtual pixel into a physical pixel in a displayable frame or off-screen buffer.

In another aspect, the computer implemented method above further includes: rendering the one or more pixels in a second resolution, wherein the second resolution renders one or more of the one or more pixels as pixels with an increased resolution and others of the one or more pixels as pixels with a decreased or the same resolution, wherein the total resolution of the one or more pixels is equal to the first resolution of the one or more pixels; assessing the one or more pixels of the second resolution to form one or more output pixels, the output pixels; and, displaying the one or more output pixels in a displayable frame or off-screen buffer.

In yet another aspect, the computer implemented method above includes receiving one or more input pixels from the graphics system; performing rendering operations on the one or more input pixels. The rendering includes the steps of selecting pixels of interest; defining a grid of sampling points; performing the sampling; collecting sampling information from each sampled point; storing sampled information of each sampled point in a virtual pixel; and, rendering virtual pixels as a separate pixel in an array of pixels.

In a further aspect, the computer implemented method above further includes the steps of: after the defining steps, collecting users' experience factors and establishing a minimum threshold for at least one users' experiences factor; and, based on the at least one thresholds, maintaining users' experiences above the established thresholds.

In an aspect, in the computer implemented method above, wherein the users' experience is collected from factors including one or more of: frame rate, heat level, responsiveness, battery level and power level.

Furthermore, in another aspect, a computer implemented method of producing output pixels for a graphics system includes the steps of: receiving one or more input pixels from the graphics system; performing rendering operations on the one or more pixels. The rendering includes the steps of: defining a first grid of sampling points of one or more pixels; sampling the one or more pixels in the first grid of sampling points; defining a second grid of sampling points of one or more pixels; sampling the one or more pixels in the second grid of sampling points; analyzing the one or more pixels with the first grid of sampling points and the second grid of sampling points for receiving meta data for rendering purposes; and, rendering the one or more pixels.

In yet another aspect, the computer implemented method includes the further step of rotating the first grid of sampling points prior to the step of sampling the first grid of sampling points. The step of rotating rotates the first grid by less than 90 degrees and preferably about 45 degrees.

In a further aspect, a computer implemented method of producing output pixels for a graphics system includes the steps of: receiving one or more input pixels from the graphics system; performing rendering operations on the one or more pixels. The rendering includes the steps of: selecting one or more pixels of interest the resolution of which are to be increased; defining a sampling grid or a sampling orientation; multi sampling the one or more pixels of interest having a first resolution and multiple sampling points; collecting information from each sampled point; storing information from each sampled point as a virtual pixel; defining one or more pixels not of interest; single sampling the one or more pixels not of interest from a single sampling point; and rendering the one or more pixels of interest in a higher resolution than the their first resolution by rendering each virtual pixel into a physical pixel in a displayable frame or off-screen buffer.

In yet another aspect, the computer implemented method includes stretching the one or more pixels not of interest into a plurality of pixels having the same higher resolution as the pixels of interest such that each pixel not of interest is duplicated into a physical pixel the same as its original pixel. Furthermore, the method includes stretching the one or more pixels not of interest into a plurality of pixels having the same higher resolution as the pixels of interest such that at least one pixel not of interest is manipulated by an anti-aliasing method into a physical pixel which is different from its original pixel. The anti-aliasing method may include one or more of the following: nearest neighbor, bilinear, Lanczos, BSpline, Mitchel or Gaussian and may take into account adjacent pixel of interest information.

In another aspect, a non-transitory computer readable medium storing a program causing a graphics processor unit is disclosed to execute image processing, the processing including performing rendering operations on one or more pixels. The rendering includes the steps of: receiving one or more input pixels from the graphics system; performing rendering operations on the one or more pixels, the rendering including the steps of: selecting one or more pixels of interest the resolution of which are to be increased; defining a sampling grid or a sampling orientation; multi sampling the one or more pixels of interest having a first resolution and multiple sampling points; collecting information from each sampled point; storing information from each sampled point as a virtual pixel; defining one or more pixels the resolution of which are one of remain the same as received from the graphics system or the resolution of which are to be reduced; and, rendering pixels of interest in a higher resolution than the their first resolution by rendering each virtual pixel into a physical pixel in a displayable frame or off-screen buffer.

In yet another aspect, a system for processing graphic content includes a graphics processor unit which provides one or more pixels; a non-transitory memory containing instruction which, when one or more pixels are received from the graphics processing unit, processes the one or more pixels to produce one or more output pixels; the instructions performing rendering operations on the one or more pixels. The rendering includes the steps of: selecting one or more pixels of interest the resolution of which are to be increased; defining a sampling grid or a sampling orientation; multi sampling the one or more pixels of interest having a first resolution and multiple sampling points; collecting information from each sampled point; storing information from each sampled point as a virtual pixel; defining one or more pixels the resolution of which are one of remain the same as received from the graphics system or the resolution of which are to be reduced; and, rendering pixels of interest in a higher resolution than the their first resolution by rendering each virtual pixel into a physical pixel in a displayable frame or off-screen buffer.

In yet another aspect, in a computer implemented method of producing output pixels for display in a graphics system, the steps comprise performing rendering operations on one or more pixels, and the rendering includes the steps of: using a Pixel of Interest (POI) analyzer to determine one or more of: (a) whether a pixel is a POI or a pixel not of interest (PNOI); (b) selecting different resolutions for a POI and for a PNOI.

In another aspect, the method further includes performing a stretcher-remapping step after rendering is completed. Rendering is performed to a buffer in a desired final resolution prior to being displayed.

In another aspect, the POI Analyzer is one of fixed or programmable. If the POI Analyzer is fixed, one or more parameters from a list of parameters is invoked. If the POI Analyzer is programmable, a pixelresolutionshader is invoked.

The method may be performed using a non-transitory computer readable medium storing a program causing a graphics processor unit to execute the above steps recited. The method may be performed using dedicated computer hardware units, and may be performed in a single pass or performed in more than one pass. The stretcher-remapping step may be one of fixed or programmable.

BRIEF DESCRIPTION OF THE DRAWINGS

FIG. 1 illustrates a number of steps in the implementation of the present invention.

FIG. 2 graphically illustrates a sampling aspect of the present invention.

FIGS. 2A and 2B illustrate a stretcher function according to the present invention.

FIG. 3A illustrates examples in which a 2×2 array of sampled points is rotated.

FIG. 5 illustrates dynamic resolution scaling of an image.

FIG. 6 illustrates spatial resolution of an image of the present invention.

FIGS. 7A to 8B graphically illustrate comparative results of dynamic resolution and spatial resolution of the present invention.

FIGS. 11B to 11E, 12B to 12D and 13A to 13D illustrate modifications of the prior art implementations with the addition of the POI Analyzer module and/or Stretcher/Remapper modules of the present invention.

DETAILED DESCRIPTION OF THE INVENTION

Figure 4:
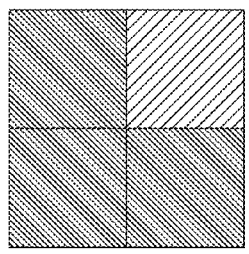
FIG. 4 illustrates further steps in the implementation of the present invention.

The dynamic resolution of a resource or a frame that is to be identified on the fly and rendered, as disclosed in the aforesaid Resolution Control application, is considered as a whole e.g. the resource resolution or the frame resolution and is affected by and has an effect on a number of factors such as the overall user experience, playability, energy saving, frame rate, responsiveness, power consumption to perform the rendering, heat effects and most certainly the quality of the visual experience.

In contrast, in the present invention, by way of example, areas of interest of a resource or a frame that are rich with edges (which can be seen as a relatively fast change of color or luminance) and therefore have large effects on the quality of the visual experience simply because edges are more pronounced and thus perceived than interior portions of a geometric figure rendering, are detected and analyzed on the fly and rendered dynamically in a higher resolution. In particular geometric edges, that is edges of a polygon to be rendered, are an important aspect and the desire is to provide relatively high resolution at such geometric edges. Anyone who has viewed geometric images on a computer or other screen will likely notice edge effects by the amount of aliasing present in the display along edges.

The present invention, among other things, aims to provide a methodology to change the resolution on a per pixel basis to render relatively sharp edges, while conserving resources discussed above. Thus, while the so-called native application renders the entire image to be rendered in the same level of resolution, in the present invention edge areas are resolved to a higher level than the remainder of the image (e.g. the interior portion of as polygon) because, as mentioned, relative lack of sharpness in non-edge areas is less noticeable to the human observer, as will be seen in the exemplary renderings of FIGS. 7A to 8B to be discussed below. In the present invention, for a pixel which is on an edge, among other things, more is "invested" to render such a pixel so that it is rendered in an increased resolution. The way this is accomplished is by multisampling that edge pixel and then convert each sampled point into a separate pixel. Another example is detecting a lighted area and "investing" in rendering lighter areas in higher resolution while rendering darker areas at a lower resolution. Another example, in a Virtual reality (VR) setting is detecting a turn or viewing direction and "invest" in increasing the resolution toward the direction the player moves while rendering opposite directions at lower resolutions.

According to one aspect of the invention, Pixels of Interest (POI), are selected to be multisampled and then rendered in a higher resolution. Such a higher resolution is based, at least in part, on information gathered from at least part of the sampling points. For the purpose of this application and as a non-limiting example, POI may be brighter areas as opposed to dark areas and vice versa; Edges, not only geometric but also within a polygon interior such as textures edges or sophisticated fragment shaders; POI may be defined based on virtual camera movement direction, angle, velocity and/or acceleration, both transitional and angular. For example, if the player is turning right then POI could be the pixels on the right area of the screen; Areas with more objects movements may be identified and defined as POI versus areas which are more static; center or central areas of the screen or scene may be defined as POI; Heads Up Display (HUD) areas may be defined as POI to also be rendered in a high resolution since the edges there are most likely not geometrical; text areas may be defined as POI; pixels close to focal planes or virtual camera; key elements in the scene such as, for example, selected characters, hand, gun or selected objects, such as for example, in any CAD, medical, educational or other application may also be defined as POI. POI may be selected as relatively close objects to the virtual camera; POI may be decided based on percentage of screen the object occupies when rendered; POI may be selected as the user's cursor; a reference POI mask, either a separate resource or inside the rendered resource. The mask can be contained in some components (such as alpha) or other metadata in the rendered resource; This can be generated by the spatial resolution controller while keeping the application transparency, or by breaking the application transparency, provided using an API from the running native application. POI may also be any combination of the above.

The present invention uses sampling information as gathered from a resource's pixel in order to scale up the resolution of this pixel in a rendered resource. More particularly, the present invention practices a targeted sampling mechanism such as used in MSAA which is targeted to multi sample only pixels which are identified as part of POI as defined above and increases the resolution of such multi sampled pixel by converting each sample point within a pixel of resource into a separate pixel in the rendered resource.

According to another aspect of the present invention, different types of pixels other than geometrical edges may be targeted for multi sampling and then rendering at a higher resolution. Rendering frames which are characterized by higher resolution along geometrical edges and lower resolution within areas that are not characterized by geometrical edges provide another aspect of the present invention that permits an effective user experience above a predefined threshold. According to another aspect of the present invention, a sampling grid having main axes which are parallel to the main axis of the sampled pixel may be utilized in order to reduce frame artifacts or calculation load.

According to one aspect of the invention, as shown in the flow chart of FIG. 1, a subset of a resource's pixels are chosen to be multi sampled. A selection of such a subset of pixels may be accomplished based on algorithms known to those skilled in the art, such as are used by the MSAA for example a jittered sub-pixel sub pixel samples using programmed sub pixel offset values which may control the number of sub pixel samples, the density of sub pixel samples or their spatial distribution. Another MSAA technique known to those skilled in the art is, for example, by creating a virtual pixel for any sampled point and then calculating coverage of samples inside the virtual pixels, by the currently rendered polygon. If at least one sample is found to be inside the polygon, and at least one sample is found to be outside the polygon, it is classified as requiring multi-sampling. Another known technique, which is effective to battle issues associated with blending in general (transparency) and more specifically with alpha-tested rendering, such as in foliage, is called "Alpha to coverage" which simulates geometrical detail, may also be used.

The MSAA algorithm identifies the subset of pixels which are located on geometrical edges. Alternatively a special algorithm may be used to identify other subsets of POI. Such algorithms may resolve all or only part of the commands or shaders associated with a pixel in order to check and decide whether such a pixel is a pixel of interest or not. Moreover, such a test may be performed based on a predefined fixed parameters e.g. resolving commands up to a certain predetermined point in order to define coverage or occlusion of a pixel. Alternatively, such a test may be performed in a more dynamic way in which the results of a first test are used in order to decide whether an additional test is needed. According to another aspect of the invention, an image may be rendered by the GPU on a screen, a printer, an off screen buffer or a HUD at a resolution level that is above a predefined resolution threshold. Such a resolution threshold may be a dynamic threshold which aims to keep a user's experience above a predefined threshold while factoring other parameters such as, for example, frame rate, heat level, latency, user's inputs, power consumption level or battery level. In addition, as known to those skilled in the art, multiple resources may be used in order to render a new resource. Also known is a single resource or a part of a single resource that may be rendered more than once into multiple resources. Therefore, according to this aspect of the invention and through the perspective of an entire frame or a group of resources, an algorithm to identify a subset of pixels of interest may select all the pixels of one or more resources to be multi sampled.

Referring now to FIG. 2, once a pixel has been selected to be multi sampled, the algorithm defines a sampling grid, in this example, being shown as a 2×2 grid which is parallel to the main X and Y axis of the physical pixel. The number of sampling points may be any number, such as 4, 6, 8, 9, 12, 16 etc. The number of sampling points may be predefined by the system or may be subject to test results which test any characteristic of the pixel. Moreover, the number of sampling points may be defined or changed on the fly as a result of information gathered from previous sampling points. For example, the algorithm may be preset to sample a single point in a pixel. Such a single point may be located for example at the center of the pixel, at the center of one quadrate of a pixel or at any other location within a pixel. Based on information gathered by this sample, the algorithm may decide to increase the number of sampling points and/or the orientation of the sampling points or grid in order to run a second sampling process. This process may be repeated up to the point the system made a final decision as to the number of sampling points and their spatial distribution within a pixel. It should be mentioned that any such decision may be done by comparing or analyzing sampled information within a pixel or between adjacent pixels. Once the system defines the number of sampling points and the pattern of sampling, the system may sample these points in whole or in part. According to one aspect of the invention, the parameters and criteria which are checked for deciding whether a pixel has to be multi sampled are analyzed and may be found not to be identical to the information required for the system in the next steps to fulfil its objectives. In this case, the system may resample at least part of these points or others in order to gather additional information. However, according to another aspect of the invention, the system may analyze the information gathered during a process of defining which pixel has to be multi sampled and find it sufficient for fulfilling its objectives downstream so that no resampling is required. The system keeps the meta data it gathers from each sample point in a virtual pixel in a memory buffer of the GPU. As can be seen in the example shown in FIG. 2, a straight sampling grid of 2×2 dimensions generates 4 sampling points. For each sampled point a virtual pixel is used in order to keep meta data gathered for this sampled point. In this example, the sampling points in quadrates 1, 2 and 3 are found to be not covered by an edge of a primitive line while the sampling point in the fourth quadrate is covered by a polygon's edge. As mentioned above, meta data related to a sampling point may contain additional or other information than coverage by a polygon's geometrical edge.

According to another aspect of the invention, and still referring to FIG. 2, at least part of the virtual pixels are rendered, based, among other things, on their meta data, into a separate physical pixel in an array of pixels which are related to the original multi sampled pixel. In this way, a pixel of interest which was selected by the system based on different criteria on a previous step is multi sampled and is then rendered in a higher resolution. According to the non-limiting example of FIG. 2, a sampling grid of 2×2 generated 4 sampling points which were converted into 4 virtual pixels while each virtual pixel was rendered into a separate pixel in the rendered image. It should be mentioned that according to other aspects of the invention the number of sampling points may be different from the number of virtual pixels if the system decides to sample and drop data or not to dedicate a separate virtual pixel to the sampled point. It is also possible that the number of virtual pixels may be different from the number of rendered/resolved physical pixels in an image. In light of considerations which will be further discussed below, the system may choose to abandon a sampling point or to combine two or more virtual pixels into a single virtual pixel. Another possibility which will discussed below is that the system will decide not to dedicate a physical pixel to an existing virtual pixel.

Referring now to FIG. 2a, a Remapper-Stretcher command of a Spatial Resolution Controller which are two aspects of the present invention are shown on one non-limiting example of dynamically converting a 2×2 pixels array, as generated by a native application, into an higher resolution array of 4×4. Original pixel A has been defined as POI and hence multi-sampled, in this example, as a 2×2 grid on points A1, A2, A3 and A4 respectively. Points A1, A2, A3 and A4 are analyzed and stored as a grid of 2×2 virtual pixels. The Remap function will then render in the real image each virtual pixel into a physical pixel designated as A1, A2, A3 and A4 in the higher resolution grid 4×4 in FIG. 2a. In order to avoid image distortion and artifacts a Stretcher function stretches and adjusts pixels B, C and D of the original resource. These pixels are designated as Pixels Not Of Interest (PNOI). As PNOI, pixels B, C and D have not been multi-sampled. These pixels were sampled by a single sampling point which is according to this example located in the pixels' center. Each of these pixels is rendered in a defined new resolution which is in this case a double resolution—each 1×1 array is converted into a higher resolution of 2×2. Therefore, the Stretcher function has to convert each of the PNOI pixels B, C and D into an array of 2×2 pixels designated in the 4×4 array of FIG. 2a as B', B'', B, , B,, , C', C'', C, , C,, , D', D'', D, , D,, respectively. According to one aspect of the present invention, PNOI are stretched in such a way that each stretched pixel is identical to its original pixel e.g. al pixels B', B'', B, , B,, are identical to their respective original pixel B. However, according to another aspect of the invention, the Stretcher function may stretch, for example, pixel B in such a way that not all of the pixels B', B'', B, , B,, are identical to their original pixel B or even in a way that none of the pixels B', B'', B, , B,, is identical to their original pixel B. Moreover, different rules may be applied to the Stretching function of each of the pixels B', B'', B, , B,, so that their similarity may vary along a full spectrum of being identical or different. The Stretch function may be a function of different parameters which may influence its stretching rules. According to one example of this aspect of the invention, a Stretch function may also act as an anti-aliasing function to those boundaries areas between POI and PNOI. In this case, a Stretch function may render pixel B', for example, under a rule regime which takes into consideration, among other things, a characteristic of an adjacent pixel A2. According to another rule regime, pixel B' may be rendered while taking into consideration pixels in a second degree of contact such as pixel A3 or even a pixel in a third degree of contact such as pixel A1. A relationship between a string of at least two pixels having different degrees of contact may also be analyzed to define and keep gradients or trends in an image and may be factored into the Stretch function to influence a characteristic of rendering any new pixel not of interest based on its spatial context. For the purpose of this aspect of the invention, as known to the skilled man in the art, a non-limiting examples for interpolation methods are nearest neighbor, bilinear, Lanczos, BSpline, Mitchel or Gaussian.

FIG. 2b shows another example, this time with a 3D resource, of a similar case as shown in FIG. 2a however, in this example of FIG. 2b, pixel B has been defined as POI while pixels A, C and D are PNOIs. In this case the original resolution of the 3D resource is 2×2×2 and the chosen rendering resolution is 4×4×4. It should be mentioned that any aspect of the invention may be governed and practiced by different processing units such as GPU or CPU. As such, the invention may be practiced to render into a back buffer for the purpose of improving or optimizing user experience factors and/or for the purpose of analyzing a resource's or a frame's characteristics by rendering into any buffer to identify occlusions or other factors. It may be used to render into off screen buffers, which have a big variety of usages, one non limiting example of which is depth maps, which render a scene from the light point-of-view, allowing adding shadows to the final image. Another non limiting example is HDR effect in which multiple off screen buffers are used in order to store a lot of information per pixel, and later in a post-processing pass generate the final scene image. Back now to the occlusion identification example, the spatial resolution modifier may better handle and optimize system resources by knowing which of the pixels are occluded and there is no reason to invest any extra calculation on them. Rendering a resource of a frame into any buffer for analyzing a resource or a frame characteristics such as occlusion may be done based on the native application resolution with a reduced resolution. In either case, the aspect of the invention of choosing POI and PNOI, multi sampling POI to get more information about these pixels and rendering them in a higher resolution may be practiced in order to improve occlusion detection whether is being done by a GPU, CPU or any other dedicated graphic processing unit.

As mentioned above for each sampled point the system may resolve and calculate all or only part of the stream of commends and shaders for the pixel, at least at the location of the sampled point, in order to gather and analyze the meta data which is associated with this sampled point while in other cases only part of the commands or shaders (if at all) has to be resolved.

Since the system selectively invests calculating and other resources in order to increase the resolution of only a sub groups of pixels out of the full list of pixels which are used to generate an image, practicing this aspect of the invention allows managing such resources, dynamically and on the fly, so that together with other users' experience influencing factors, the overall user experience is maintained above predefined thresholds.

Figure 3:
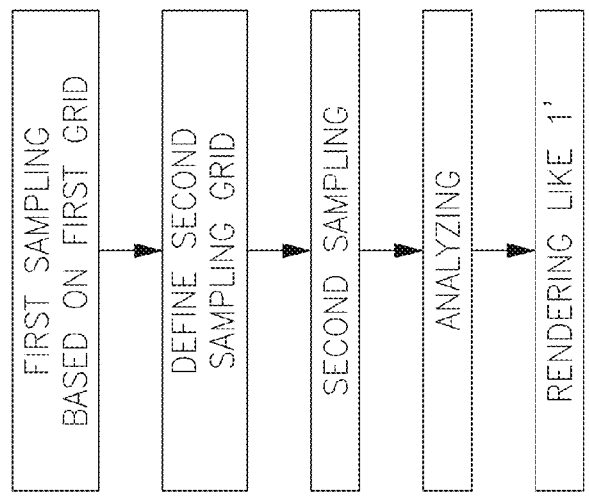
FIG. 3 graphically illustrates a sampling grid analyzed in the present invention.

According to another aspect of the invention, as is shown in FIG. 3, a first sampling grid is chosen for the purpose of analyzing one or more areas within a resource's pixel while a second sampling grid is used for the purpose of gathering meta data for rendering. In order to render multiple sampled points from a single pixel into an array of multiple pixels while keeping the integrity of an image, there must be a straight geometrical and spatial relationship between a sampled point and its associated rendered pixel. According to this example, the first 2×2 sampling grid is rotated by 45° relative to the main X and Y axis of the original pixel. Therefore, rendering these rotated sampled points as-is into a straight array of 2×2 physical pixels in the final image will distort the image. However, in some circumstances using a rotated grid or other grids for the sake of analyzing a pixel provides better measurements of the characteristics of such pixel. However, as mentioned above, the information may not be good enough for rendering the pixel at a higher resolution. Therefore, according to one aspect of the invention, the system analyzes a pixel with a first grid of sampling points and then uses a second grid of sampling points to gather information to be at least partially rendered. Such a process is flow charted in FIG. 4. This is only one example of how a known MSAA technique may be used and incorporated into the present invention. FIG. 3a shows another example of such an incorporation wherein in block A' a rotated 2×2 array of sampling points is shown. Such an array may be used, according to this example of the invention, first in order to sample a pixel for the purpose of practicing anti-aliasing using a known MSAA2×2 methodology and second, using the information gathered from any sampled point to create a virtual pixel which is then rendered into a real pixel using the spatial resolution system to enhance resolution of an original pixel. Block B' in FIG. 3a shows another non-limiting example showing another way to practice the new spatial resolution system with a known MSAA2×2 straight sampling array. As in the previous example, first any sampled data point is being used for practicing anti-aliasing and then the same data point is used in order to create a virtual pixel which may be rendered into a physical pixel to enhance the resolution of an original pixel. Block C' in FIG. 3a shows another non-limiting example of how to incorporate and practice the present invention with anti-aliasing methodologies. According to this example, there is a top-level, straight array of 2×2 sampling points, while each point consists of a rotated sub-level sampling array of another sub-array of 2×2 points. According to this example, all sampled points may be used for the purpose of anti-aliasing as known to those skilled in the art, while each rotated sub-level sub-array of sampling points may be averaged or otherwise be calculated or used in order to create a virtual common sampled point which is part of the top-level straight grid. As mentioned above, such a common sample point of a straight grid may be used to create a virtual pixel which may be rendered into a physical pixel to enhance the resolution of an original pixel. It should be mentioned that many other combinations of arrays and sub-arrays may be practiced—one, two, three or more layers of sub-arrays each may have different number of sampling points and spatial distributions. Different methodologies may be used in order to convert a sub-array of sampling points into a virtual common sample point. In addition, the spatial resolution system subject to some aspects of this invention may be practiced by other known anti-aliasing methodologies such as super sampling or others.

Referring now to FIG. 5. The spatial resolution controller which is the subject of this invention may run seamlessly and on the fly between the native graphical application which is run on a computer's CPU and an associated GPU. One aspect of the present invention is to establish minimal thresholds for users' experience and to maintain the users' experience above such thresholds. As users' experience is a factor of multiple parameters as mentioned above, according to one aspect of the invention, the system may dynamically and on the fly change at least part of these parameters while trading off one with another. Along this process, for example, the system may increase the frame rate while reducing resolution. As the native application runs the entire ecosystem of the application and/or the hardware on which the application runs may change, different decisions may be made in order to optimize user's experience in such an evolving and demanding environment. FIG. 5 shows an example of a resource in an original frame which is to be rendered in a following frame. It may be that this resource was at a higher resolution than in a previous use of the application and the system had chosen to reduce it. This information is now lost. It may happen that such a decision had been made in order to increase frame rate or consume less energy, for example. Now, the system needs to adjust this resource again to fit the new frame proportions. As known to those skilled in the art and as disclosed in the Resolution Control application, there are multiple ways to spread a resource into a bigger size. This usually involves downgrading the quality of the resource's image and this may damage the entire users' experience. According to this aspect of the invention, spreading a resource during a dynamic resolution process may be done in such a way that points of interest are detected, multi sampled and are rendered with higher resolution. In this way the system may invest some costs in critical areas such as edges, lighted area, forward directions etc. in order to maintain or improve the overall users' experience within the allowed boundaries as defined by the user experience set of thresholds.

Referring now to FIG. 6, in this example a resource in a previous frame may to be rendered in a following frame. In this example, unlike the example of FIG. 5, no dynamic resolution algorithm as disclosed in the Resolution Control application is used. Instead, in this example, the overall resolution of the original resource is equal to the overall resolution of the resources as it is rendered in the new frame. For this example, an overall resolution of a resource may be defined by the relative number of pixels a resource consumes from the entire available pixels available to the entire frame or to the resource. In this example, since the entire number of available pixels on the screen is equal there is no change in the physical dimension of the resource between the previous frame and a following frame. However, according to this aspect of the invention, the spatial resolution within the resource may be different from one area to another. Based on this aspect of the invention, the system may keep the overall resolution of a resources unchanged (no dynamic resolution algorithm is used). However, the system may decide to render certain areas of interest at a higher resolution. In order to keep the overall resolution of the resource the same, the system then needs to also reduce the resolution in other areas in a similar proportion. This sum zero game of pixel budget calculation and compensation may be done on a resource by resource basis or on a group of resources basis or on an entire frame basis. The boundaries in which this sum zero pixel budget calculation and compensation is being done may be defined by any number or combination of user's experience factors and by their minimal values, or by their maximal values, or by the required or allowable values or range of values as may be defined by the spatial resolution controller or by a user or a programmer through a control panel which is further described below as an another aspect of the invention.

Figures 7A, 7B:
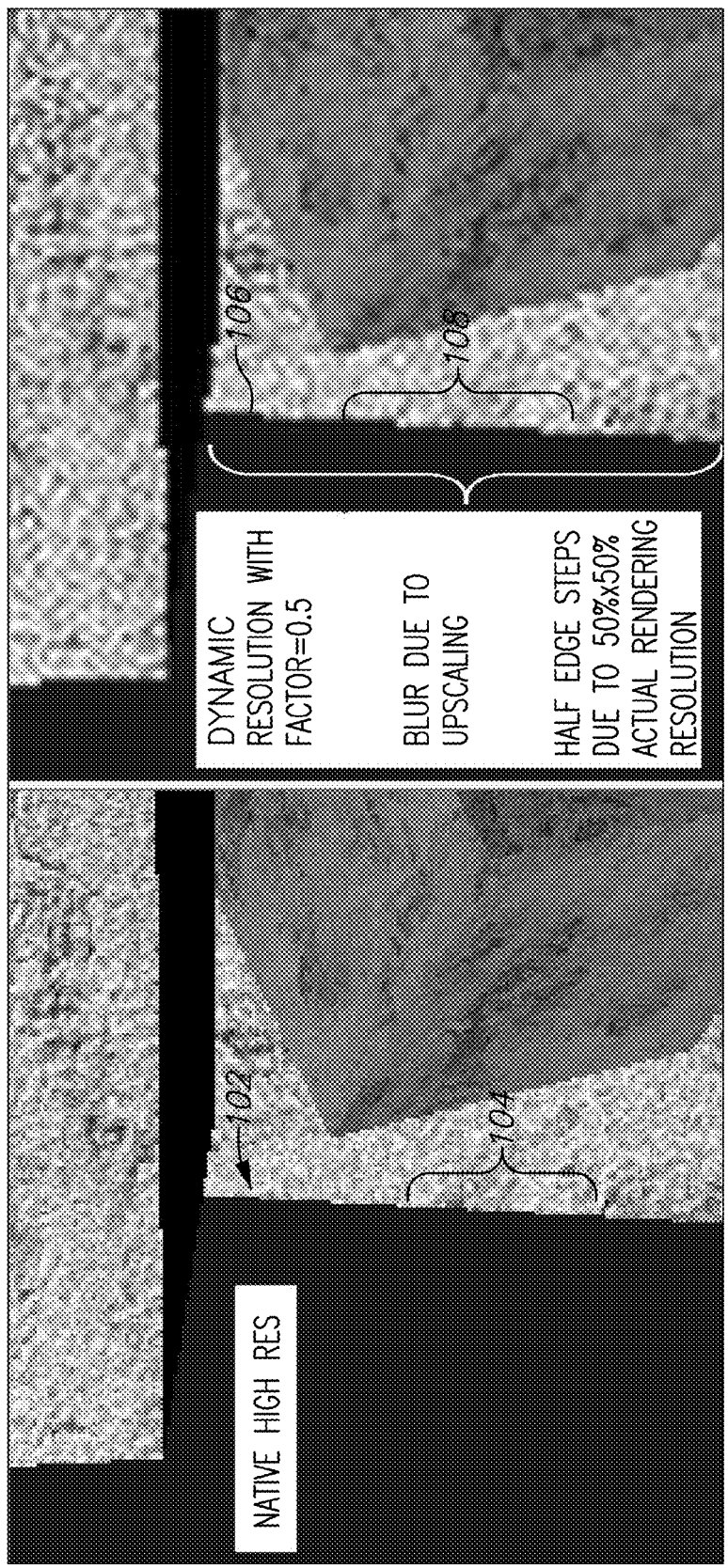

Turning now to FIGS. 7A, 7B, 8A and 8B, these figures show exemplary comparative results of image manipulation using native high resolution, dynamic resolution, and the spatial resolution that is the subject of this invention. As seen in FIGS. 7A and 7B, the high resolution image shows relatively "sharp" edges 102 with smaller "steps" 104. Manipulating this image with a dynamic resolution algorithm results in FIG. 7B, in which the edges 106 are blurry and the number of "steps" 108 is smaller than the comparative steps 104 in FIG. 7A.

Figures 8A, 8B:
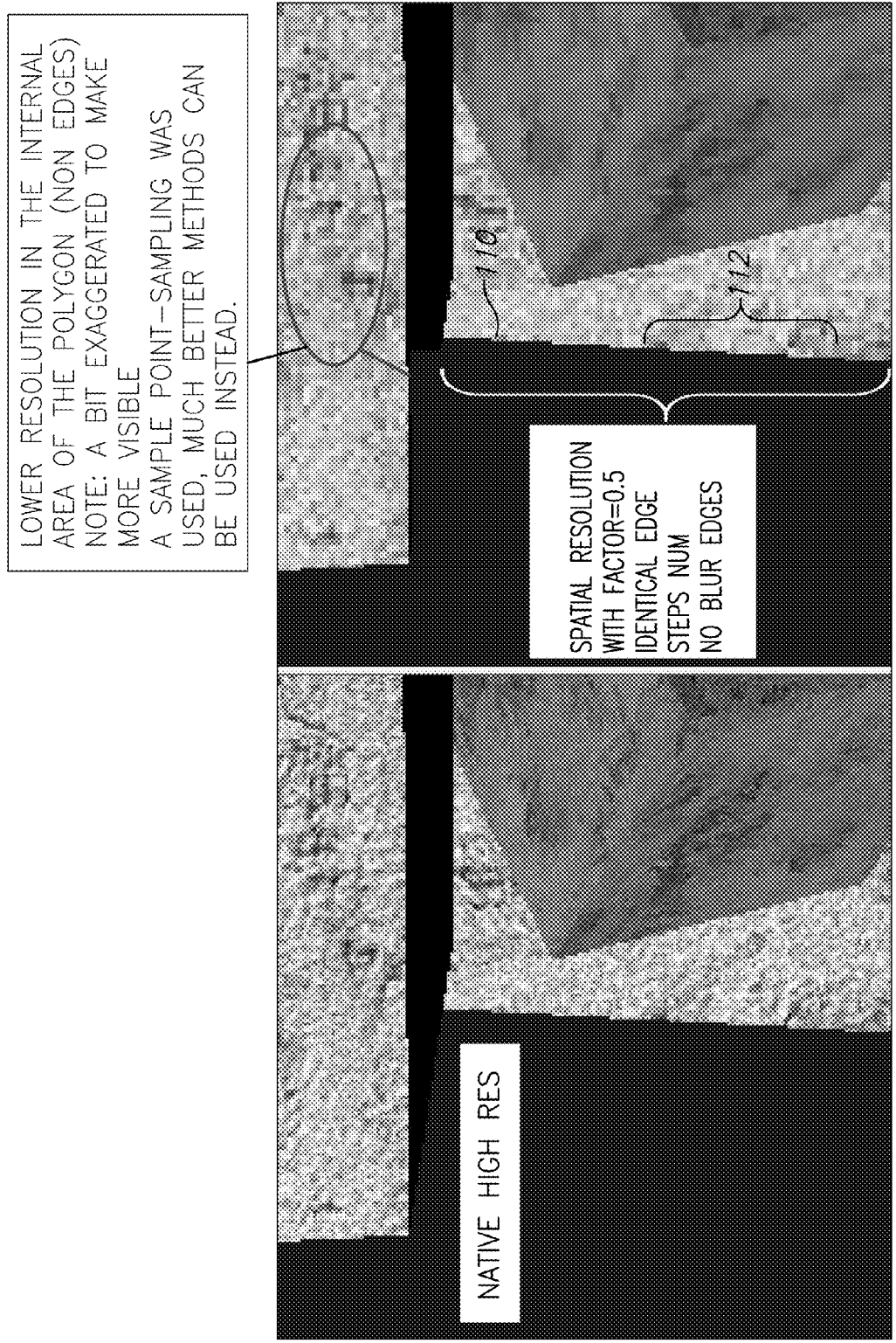

Turning now to FIGS. 8A and 8B, FIG. 8A is, like FIG. 7A, the result of native high resolution. FIG. 8B on the other hand, shows the result of image manipulation using the spatial resolution algorithm of the present invention. It is to be noted that edges 110 are as sharp as those in FIG. 8A and that the number of "steps" 112 is the same as in FIG. 8A. This graphically illustrates the benefits of using the spatial resolution algorithm of the present invention.

Another aspect of the present invention is to practice any element or any combination of elements of the invention described herein for rendering a resource or a frame by a GPU into any frame buffer or display, for rendering any frame buffer or display by a CPU or by any general processing unit or dedicated processing unit which processes or may process graphics such as processing units which are dedicated to process ray tracing or path tracing or any processing units which is configured to or may conduct such processing. Another aspect of the present invention is conduct such processing by a multiple processing units such as CPU's, GPUs, or the like in different combinations and whether they are discrete or integrated processing units.

While the invention described herein may be implemented in a computer program on a general purpose computer, it is envisioned that the invention may be implemented in different combinations of software, firmware or hardware including, for example, a user interface and/or a control panel which may be designed for an end user of a graphics system or for a developer of a graphics system or both. According to one non-limiting example of the present invention which is shown below there is a use and modifications of DirectX rendering APIs. In this example the native application may use DirectX API and then a DirectX runtime talks with driver modules that are supplied by the GPU vendor e.g. nVidia or AMD. In an MSAA D3D11_TEXTURE2D_DESC command is sent to CreateTexture2D( ) function which includes a type of SampleDesc. Such a type of SampleDesc includes two parameters: Count—which defines the number of samples per pixel and Quality which may control other behaviors as defined by the vendor such as different sampling patterns. According to another non-limiting example of the present which is shown below, invention a native application may use an OpenGL API, usually through a very thin layer that simply redirects the call to the GPU vendor's supplied driver. A new functionality may be added to the GPU by adding OpenGL/GLES Extension. Such supported extensions can then be requested and called by a developer and/or can be modified, defined or controlled by an end user through dedicated interfaces. The non-limiting methods and examples described herein may be changed or combined in whole or in part.

Example A

On top of DXGI_SAMPLE_DESC type, CreateTexture2D will also receive a new argument, DXGI_SPATIAL_SAMPLE_DESC type which will look like this:

```
typedef struct DXGI_SPATIAL_SAMPLE_DESC {
  UINT Count; //how many samples used
  UINT PoiType;//each number represents which type of poi we want to use
  (geometrical edge, user supplied matrix with poi info, etc.)
} DXGI_SPATIAL_SAMPLE_DESC;
```

Example B extending DXGI_SAMPLE_DESC type to become:

```
typedef struct DXGI_SAMPLE_DESC {
  UINT Count;
  UINT Quality;
  //
  UINT Spatial_Count; //0 or 1 would mean turn spatial resolution off
  UINT PoiType; //ignore if previous is 0 or 1
} DXGI_SAMPLE_DESC;
```

Option C:
Add a special Format that enables special resolution.
CreateTexture2D( . . . , format=0×FFDD, . . . )
0×FFDD means—use spatial resolution More non-limiting examples for practicing the invention in OpenGL which is supported in all desktop's OS or in GLES which is supported in mobile devices OS e.g. android or iPhone are shown below. As known to the skilled man in the art, the following example is one known way to practice anti-aliasing such as MSAA in an OpenGL environment:

```
glGenTextures( 1, &tex );
glBindTexture( GL_TEXTURE_2D_MULTISAMPLE, tex );
glTexImage2DMultisample( GL_TEXTURE_2D_MULTISAMPLE,
num_samples, GL_RGBA8, width, height, false );
```

The following are two non-limiting examples for practicing the spatial resolution system, which is the subject of some aspects of this invention, in an OpenGL/GLES environment:

Option A:
Add another arg to: glTexImage2DMultisample
For example, adding another argument that passes the amount of samples required for spatial resolution.

```
glTexImage2DMultisample( GL_TEXTURE_2D_MULTISAMPLE, num_samples, num_spatial_samples, poi_type, GL_RGBA8, width, height, false );
```

Similarly, a glTextImage2D may be used, which is the version that doesn't use MSAA. The glTextlmage2D will be changed to become:

```
glTexImage2D (GL_TEXTURE_2D, 0, num_spatial_samples, poi_type ,GL_RGBA8, width, height, ...);
```

Option B:
Add another function that is used to define spatial resolution for currently bound texture.
glGenTextures(1, &tex);

```
glBindTexture( GL_TEXTURE_2D_MULTISAMPLE, tex );
glTexImage2D (GL_TEXTURE_2D, 0, GL_RGBA8, width, height, ...);
glSpatialResolution( sample_count, poi_method);
```

Another example, combining this theoretical method with MSAA could be:

```
glGenTextures( 1, &tex );
glBindTexture( GL_TEXTURE_2D_MULTISAMPLE, tex );
glTexImage2DMultisample( GL_TEXTURE_2D_MULTISAMPLE,
num_samples, GL_RGBA8, width, height, false );
glSpatialResolution( sample_count, poi_method);
```

Other control methods on a developer level may be a general option API such as for example:

```
EnableSpatialResolution(sample_count, poi_method);
DisablePatialResolution( )
```

In another aspect of the present invention, the rendering pipeline may be changed in a fashion that does not require the multi-sampling discussed above. (The spatial resolution functionality may, however, still be combined with "native" multi-sampling-anti-aliasing functionality if desired).

A POI Analyzer (either fixed or programmable by the graphics pipeline API user) samples pixel values to make a decision whether the pixel is a POI or a PNOI, as those terms are defined and discussed previously and as well selects different resolutions for different areas in the being-rendered image. By way of example only, above was discussed selecting POIs may be carried out in a number of modalities, as discussed on pages 7 and 8 of the present invention specification.

Rendering is performed to a buffer in the desired final resolution, where pixels are being rendered with varying resolutions, based on region of the image to be displayed. For example, a pixel which was selected by the POI Analyzer to be of high detail/resolution may have each individual pixel fully calculated via the "standard" fragment/pixel shaders. However, a region that was classified as less important may have a single pixel value calculated for an entire patch, for example, of size 2×2. The calculated values may be remapped into identical copies of the calculated value into all of the pixels that are found in this patch, or the calculated single pixel value can serve as a base for interpolation, along with the pixel neighbors (also from other pixels/patches).

The Stretching-Remapping step can happen either as an extra step after all rendering was done for the current-rendered-image, or at any rendering command without adding an extra step.

The advantages of performing in this manner, at the rendering-command level without an extra step, is that it can be more cache friendly, also that invoking a "temporary" buffer can be avoided. Another important advantage is that in the case of overdraw (pixel values being replaced during the course of a frame, usually due to objects hiding each other, and rendering order), the stretcher-remapper would not have to be activated an excessive amount of times. Also, in the case of alpha-blending and/or alpha-testing and/or depth test and/or stencil test or scissor/test and other raster operations, the stretcher-remapper will act on post raster-operations fragments/pixels.

On the other hand, the advantages of doing a separate stretch-remap step is having all neighboring pixels known for the stretch-remap step, in case that interpolation is being used. In this new change to the graphics pipeline, pixel/fragments shaders remain as is, or require a very minimal change. This is important, as it makes implementation of this solution significantly easier when designing hardware and/or firmware that supports the suggested graphics pipeline change. In addition, it's very important that porting existing content, which usually has dozens and sometimes hundreds of existing pixel/fragment shaders, will require either no change to those shaders, or extremely minimal changes.

Figure 9A:
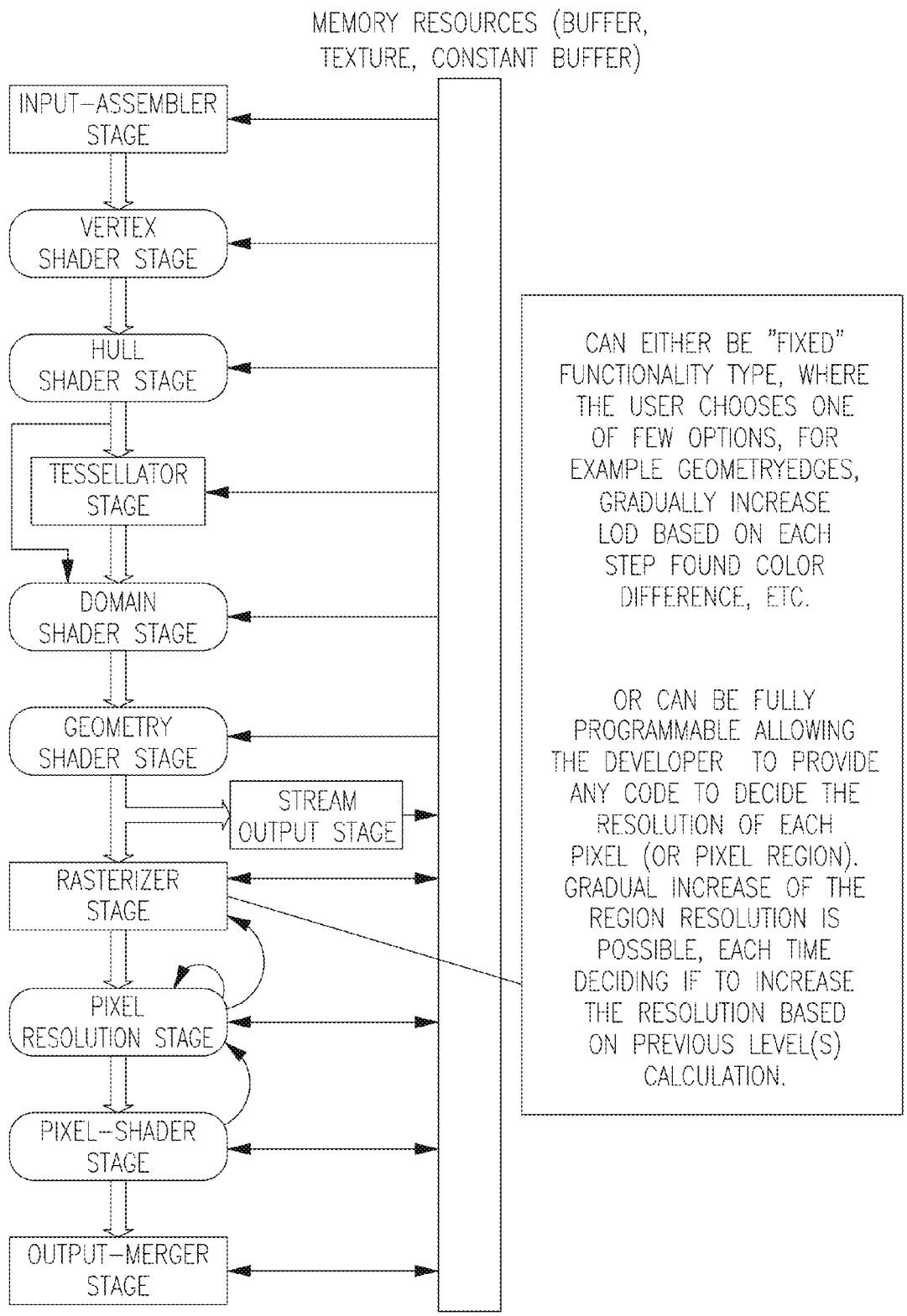
FIG. 9A illustrates a scenario in which PixelResolution stage is added, and being controlled either by fixed functionality, via modes and parameters (or just on/off), or programmable.

Zooming in on the rasterizer and fragment/pixel shader in a typical modern graphics pipeline, amongst other responsibilities, the rasterizer, illustrated in the diagram of FIG. 9A, is responsible for determining how and where pixels fragment/shaders are invoked. In the present invention, the selection of which and how much fragment/pixels shader calculation instances to invoke is based (amongst other standard things) on the POI Analyzer. In the case that POI Analyzer is implemented, the rasterizer can use the POI functionality, or can implement this functionality on its own. The POI Analyzer may be either fixed or programmable.

In the case that the POI Analyzer is fixed, it is one of supported mode, along with possible list of parameters. As an example, one mode could be geometrical edges, and a parameter could be how much to "dilate" (extend) the detected edges to prevent holes in the detected edges. This is just an example, however, and, as mentioned previously, there are many other possible POI selection modes. In addition to those examples of API changes mentioned previously ("glSpatialResolution" and others described above as Option B on page 18 of the present specification), another possibility is to add keywords to the fragment/pixel shader. A simple example would be adding "POI GeomEdge dilate=3.7" which configures the POI Analyzer to be active, and sets its mode to provide more resolution to pixels found on geometry edges, and also dilate the selection a bit using the param 3.7 to describe how much to dilate.

In the case that the POI module is programmable, a new shader type is introduced into the graphics pipeline, the PixelResolutionShader. The input for this shader is a pixel region to decide on, along with standard available resources to shaders such as buffers, textures, shader constants etc., and the output of this shader, is the resolution of the pixel region in question. As an example of the versatility of the present invention, an existing content with 100 fragment shaders can keep all fragment shaders as is, or almost entirely as is. A developer can write single code of a PixelResolutionShader, and either activate spatial resolution by an API command (such as the "glActivateSpatial" of Option B above) or by adding a single line at the top of the fragment shaders such as "POI on". This operation can be done automatically when compiling the shaders and therefore is an extremely minor change to the pixel shader, and no change of actual logic of it. Another example is adding a command such as PRSSetShader( . . . ) (PRS=PixelResolutionShader) which sets the active pixel resolution shader, and passing PRSSetShader(NULL) when desiring to turn the programmable PixelResolutionShader off. While the foregoing is relevant on all graphics oriented platforms, it's especially valuable on mobile devices, due to variety of operation systems and devices strengths, in which porting and supporting many platforms easily is a big advantage.

Figure 10:
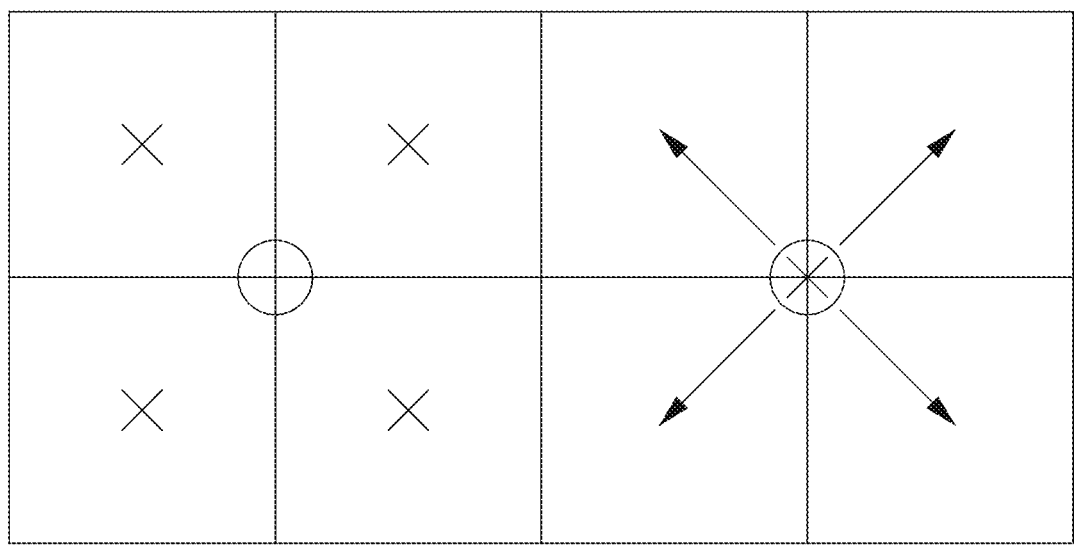
FIG. 10 illustrates an example of the operation of the POI Analyzer of the present invention.

Regardless of whether the POI is fixed or programmable, there's a big advantage to this technique over existing prior art literature in terms of efficiency such as "Extending the Graphics Pipeline with Adaptive, Multi-Rate Shading", by He et al. (ACM Transaction on Graphics (TOG)—Proceedings of ACM Siggraph 2014, Vol. 33, Issue 4, July 2014). (Hereinafter referred to as the "Multirate Paper"). This can be easily demonstrated by looking at a simplified case, of two 2×2 regions in a theoretical 4×2 image illustrated in FIG. 10. In FIG. 10, the left 2×2 patch was selected by the POI Analyzer to be in high resolution. Circles describe POI module invocations, X marks fragment/pixel shader invocations, and arrows describe stretching-remapping operations.

It is clear in this image that there need only be a total of 5 fragment/pixel shader invocations. This is lower than the native 8 fragment/pixel invocations, and also lower than the 8 coarse/sparse shader invocations that are mentioned in the MultiRate Paper. This is especially important since every programmable shader invocation has its cost, and this cost is high since it cannot be fully optimized in advance.

The stretch-remapper functionality, either in the scenario that it is implemented to operate fully within a single rendering operation, or in the scenario that it's implemented as a separate step, may be also be implemented as programmable shader, allowing more control of the user/developer of the graphics rendering API, if functionality beyond the fixed functionality is needed. This has the disadvantages of being less efficient then fixed functionality, but more flexible.

Figure 9B:
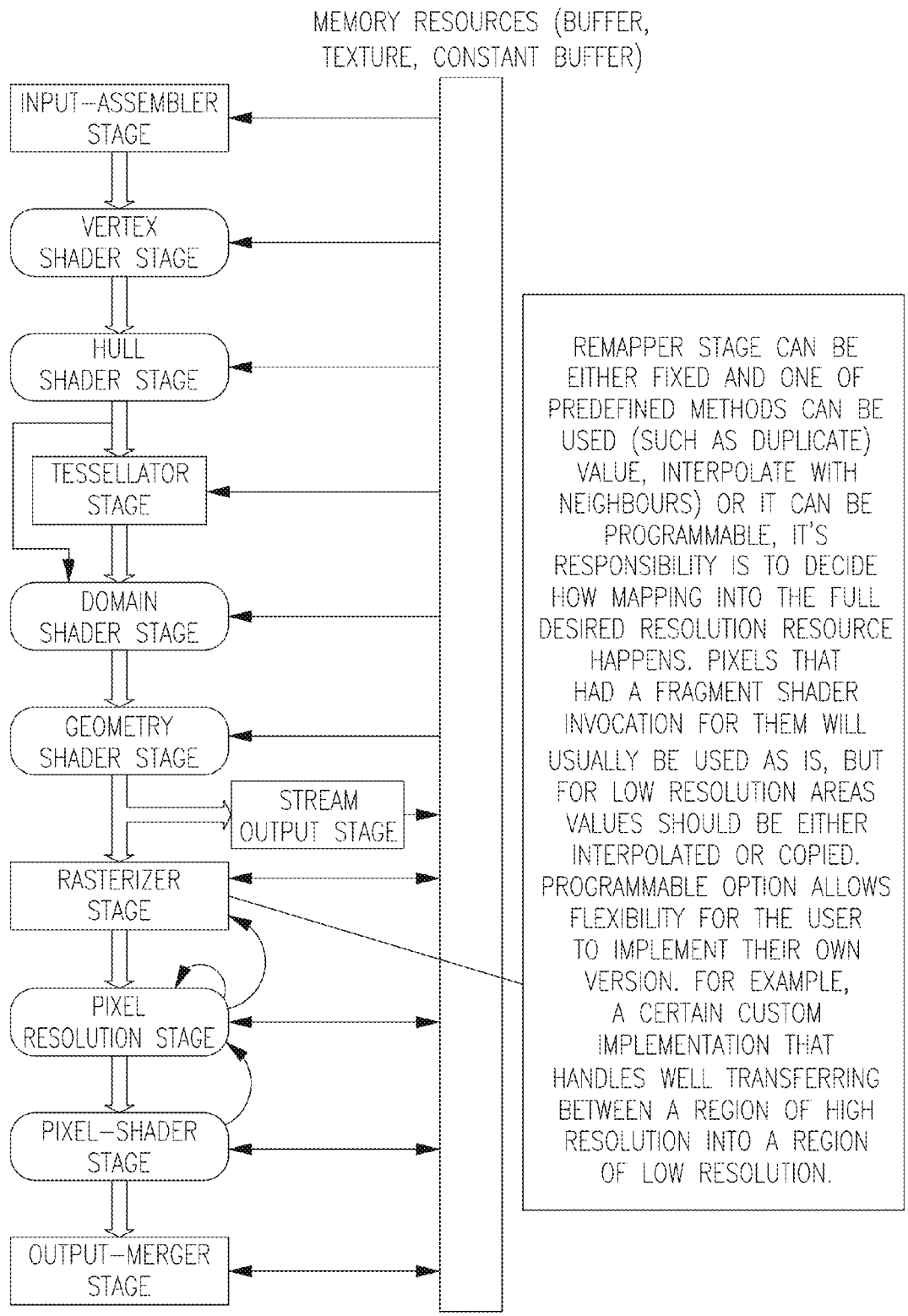
FIG. 9B illustrates the stretch-remapper stage, which is either fixed functionality, via modes and parameters (or just on/off), or programmable.

In both FIGS. 9A and 9B, the arrows that are shown, that go from PixelResolution Stage to itself, from PixelResolution stage to the rasterizer stage, and from pixel shader stage back to the PixelResolution stage, describe an iterative process in which region resolution gradually grows upon need. For example, in a N×M patch region, the PixelResolution stage may render k1 first fragments/pixels, do a computation (as a simple example, check how different the values are) and, if desired, increase the amount of the rendered fragment/pixels into k2 fragments/pixels, up to a level of (N×M) fragments/pixels. The process can involve going back and forth between the modules, or can occur internally in one of the modules.

We now provide non-limiting exemplary code illustrating the operation of the PixelResolutionShader and the StretcherRemapperShader.

```
PixelResolution_Shader_Example.txt
// example of shader code that may be used or triggered by the
POI analyzer.
//in this example, pixel patches that arrive from closer objects will get
higher resolution
//the return value describes the desired pixel/patch/region resolution
//note that in this example, return value of 0 means maximal resolution,
and the higher the return
value, the lower the desired resolution of this pixel/patch/region
    struct poi_input {
        float3 pos;
        float depth;
    }
    int main( poi_input in) {
        if (depth <= 0.2) return 0;
        if (depth <= 0.5) return 1;
        if (depth <= 0.7) return 2;
        return 3;
    }
    StretcherRemapper_Shader_Example.txt
    // example of a simple linear interpolation stretcher
    Pixels main( Patch patch, float2 pos) {
    If (0 == patch.POI_Level) return patch.samples; //patch.samples is an
array of the rawsamples
    Int2 neighbors [ ] = { (0,0), (-1,0), (1,0), (0,-1), (0,1) };
    float4 accumulate = (0,0,0,0);
    for (int2 n in neighbors) {
        float4 neighbor_val =GetPatchAverage(patch ,pos+n); //gets the
average value of this patch, regardless of the its POI level.
        accumulate += neighbor val;
    }
    return accumulate / len(neighbors);
    }
```

All of the mentioned embodiments described herein may be implemented in hardware/firmware that contains graphics pipeline functionality. Unified shaders as mentioned in Wikipedia under "Unified shader model"] or any computation unit can be used to process tasks of programmable shaders such as PixelResolutionShader and/or RemapperShader. In the case of fixed functionality in either of the mentioned shaders, can be implemented more efficiently with "hardcoded/hardwired" functionality, trading off flexibility with efficiency (performance/heat/battery). Also, fixed code can be created to support fixed functionality, while not providing the user a method to provide custom shader code. The existing rasterizer module may be modified to support the PixelResolution stage (fixed and/or programmable) and/or the Remapper Stage (fixed and/or programmable). It may implement itself the equivalent functionality of the PixelResolution stage and/or Remapper stage.

Figure 11A:
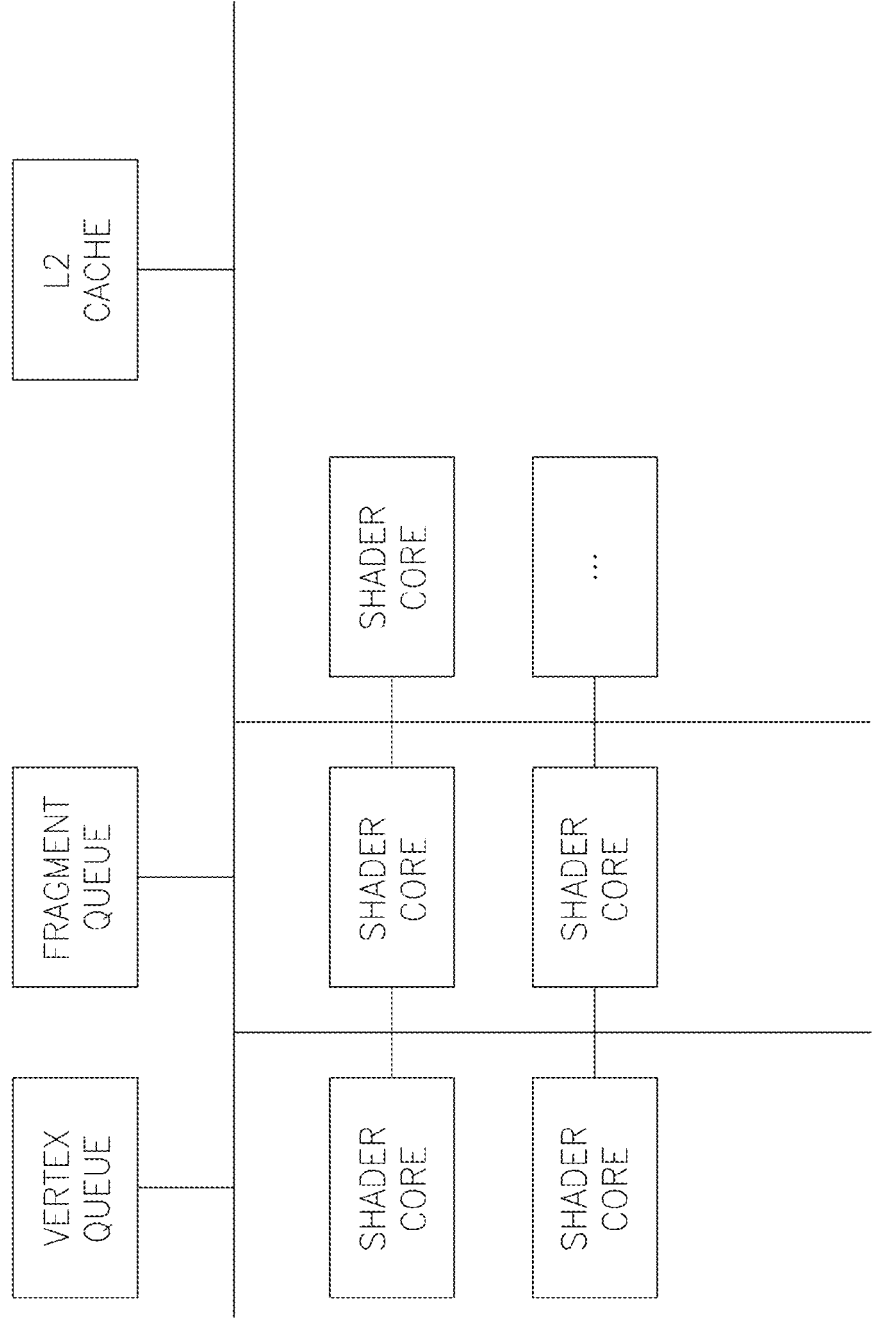
FIGS. 11A, 12A and 13A illustrates a prior art hardware implementation.
Figure 11B:
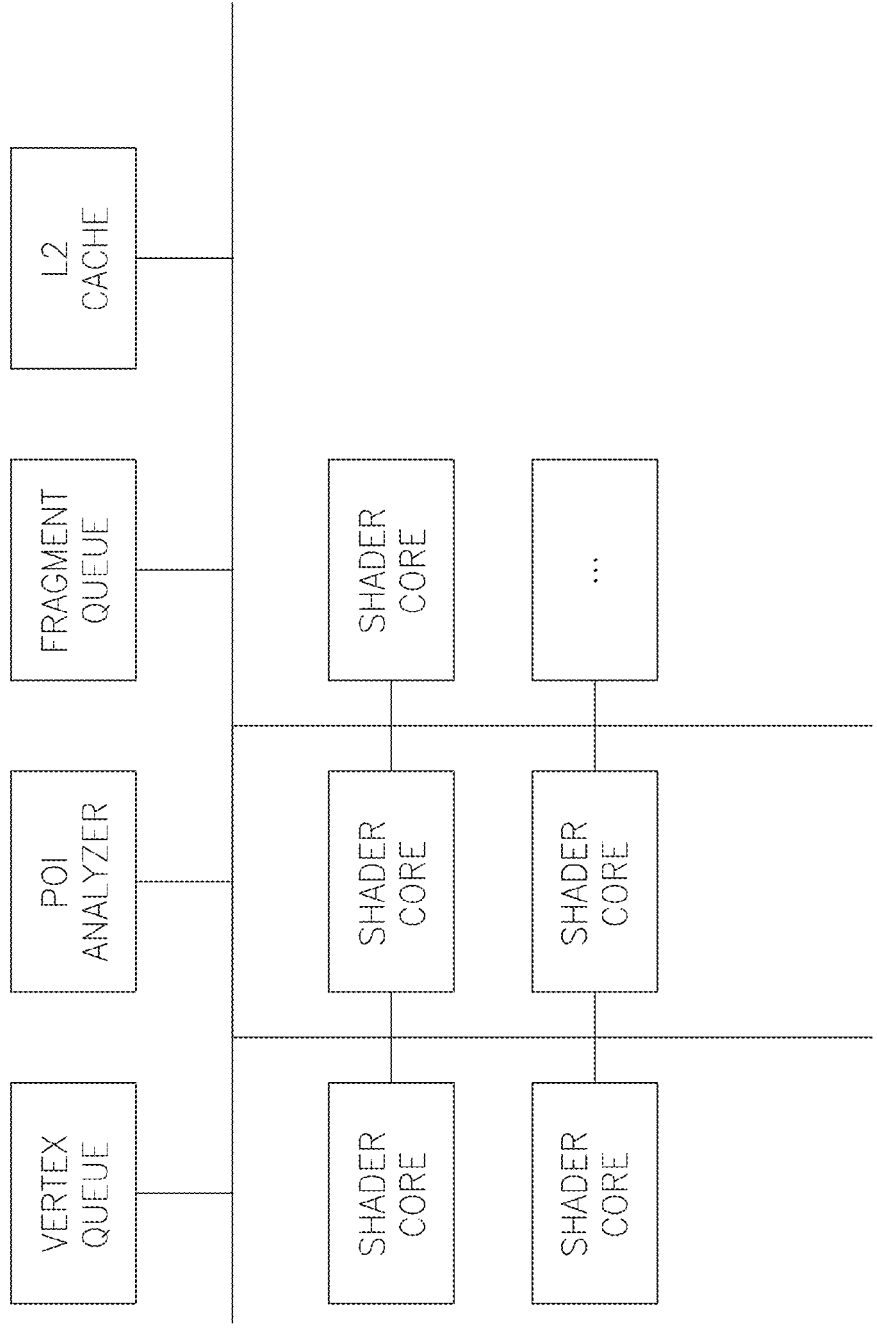
Figure 11C:
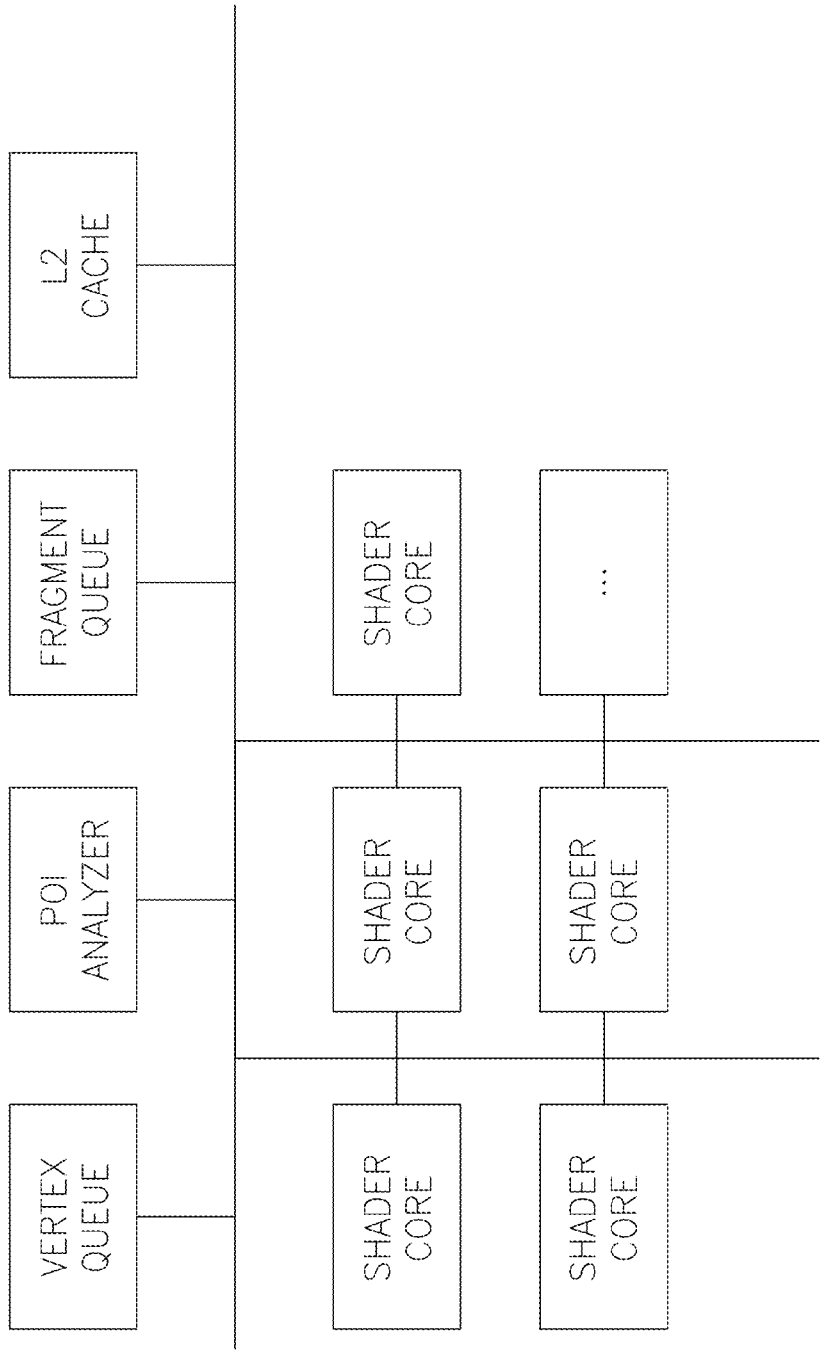
Figure 11D:
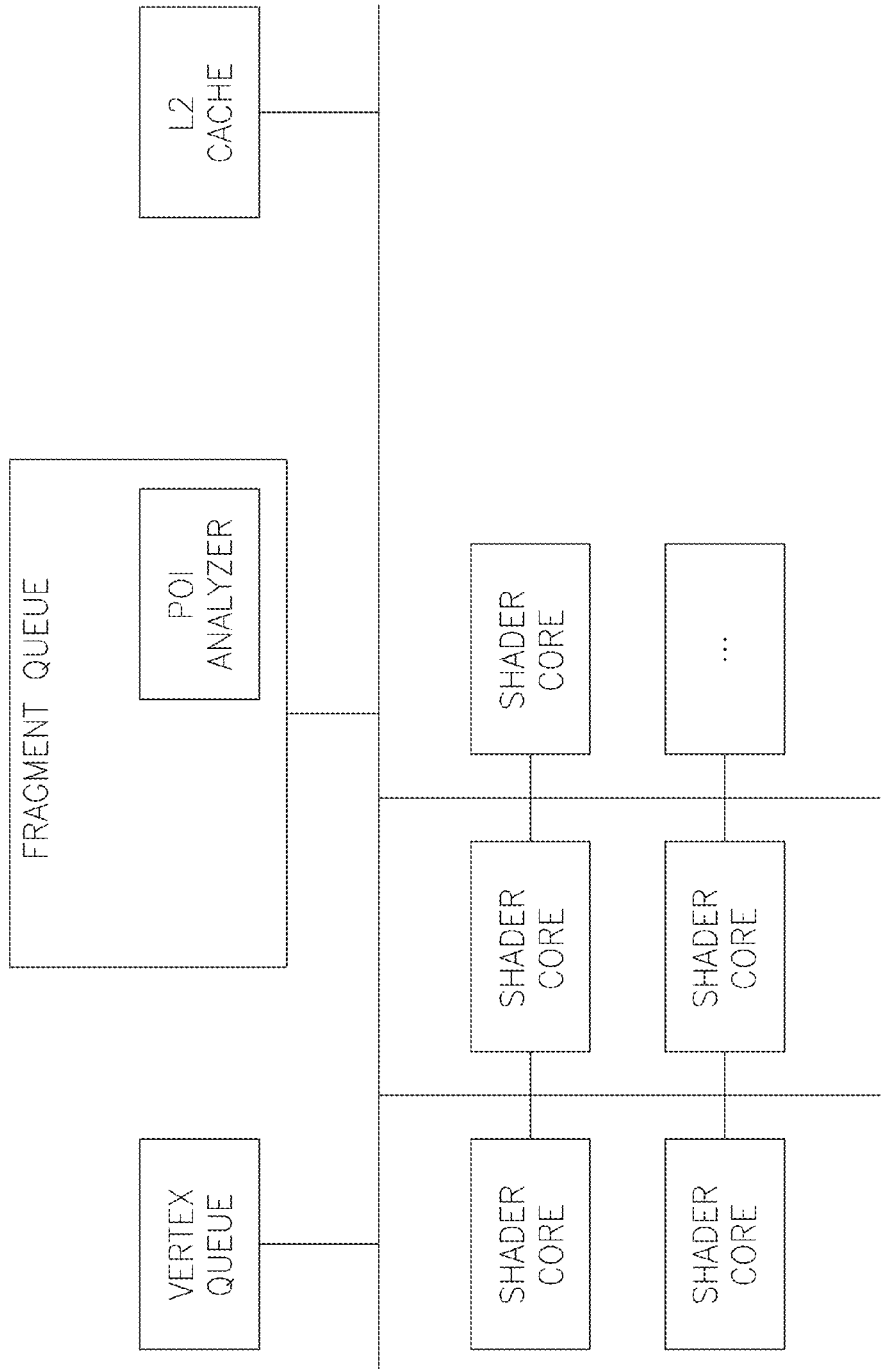
Figure 11E:
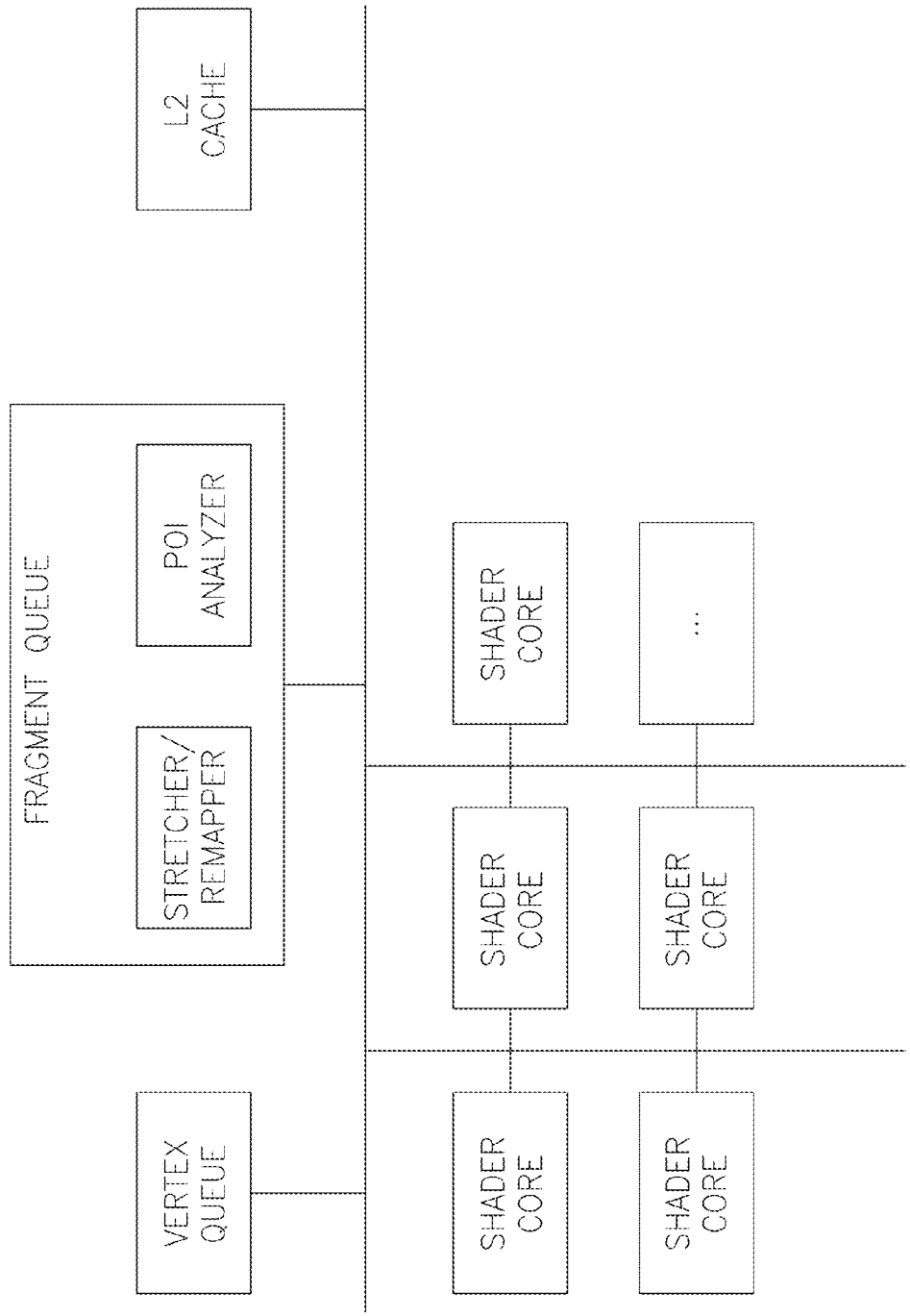
Figure 12A:
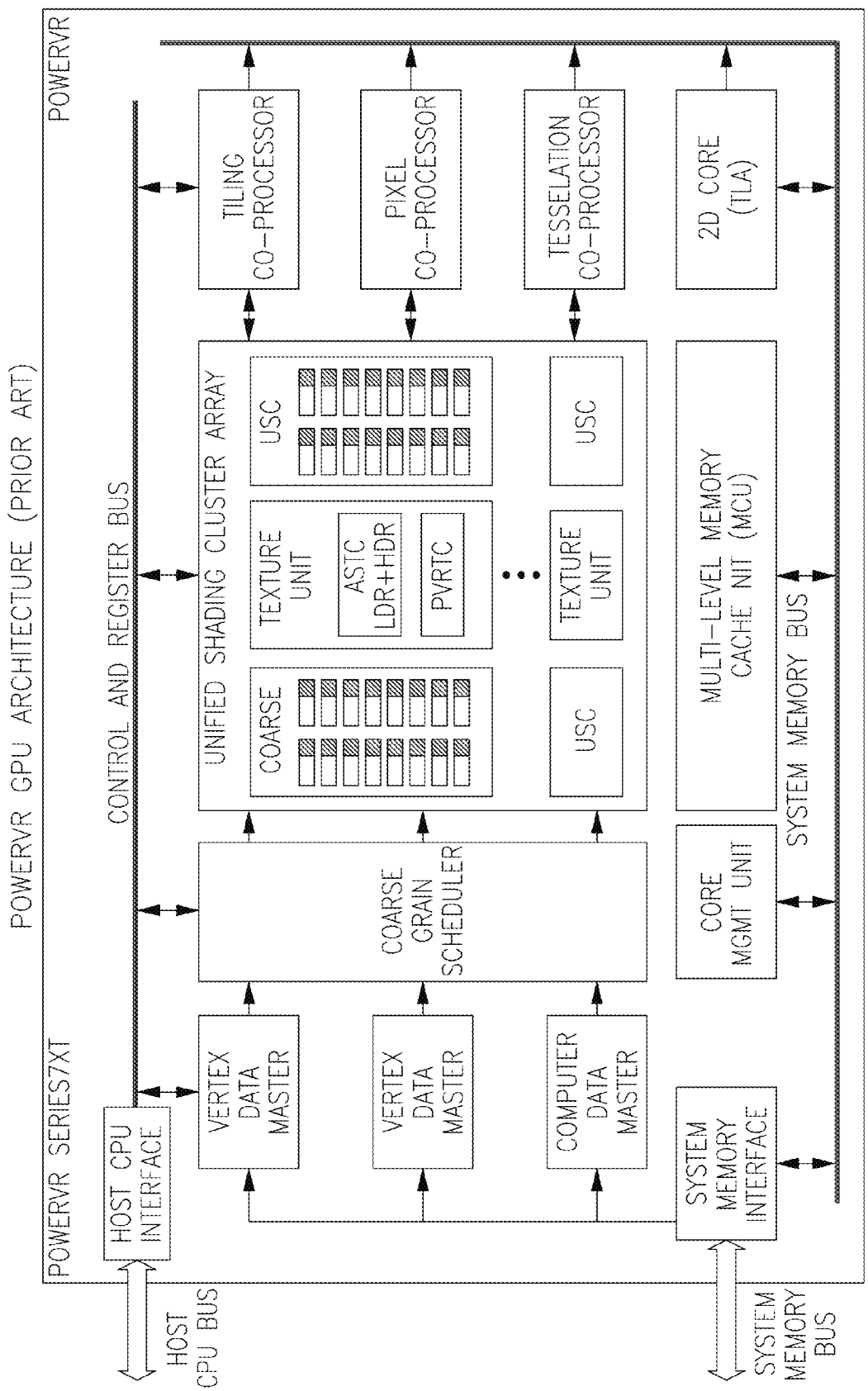
Figure 12B:
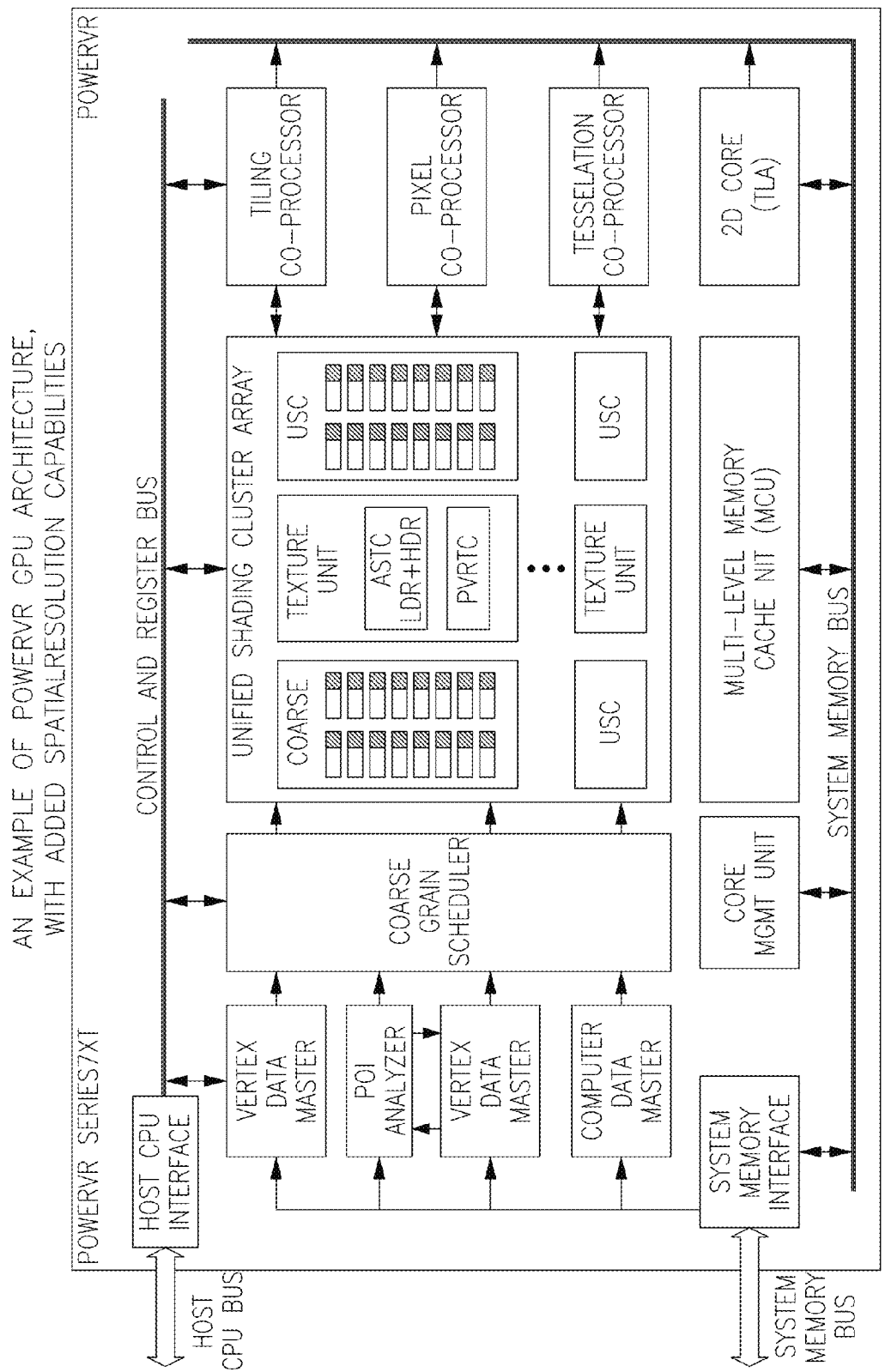
Figure 12C:
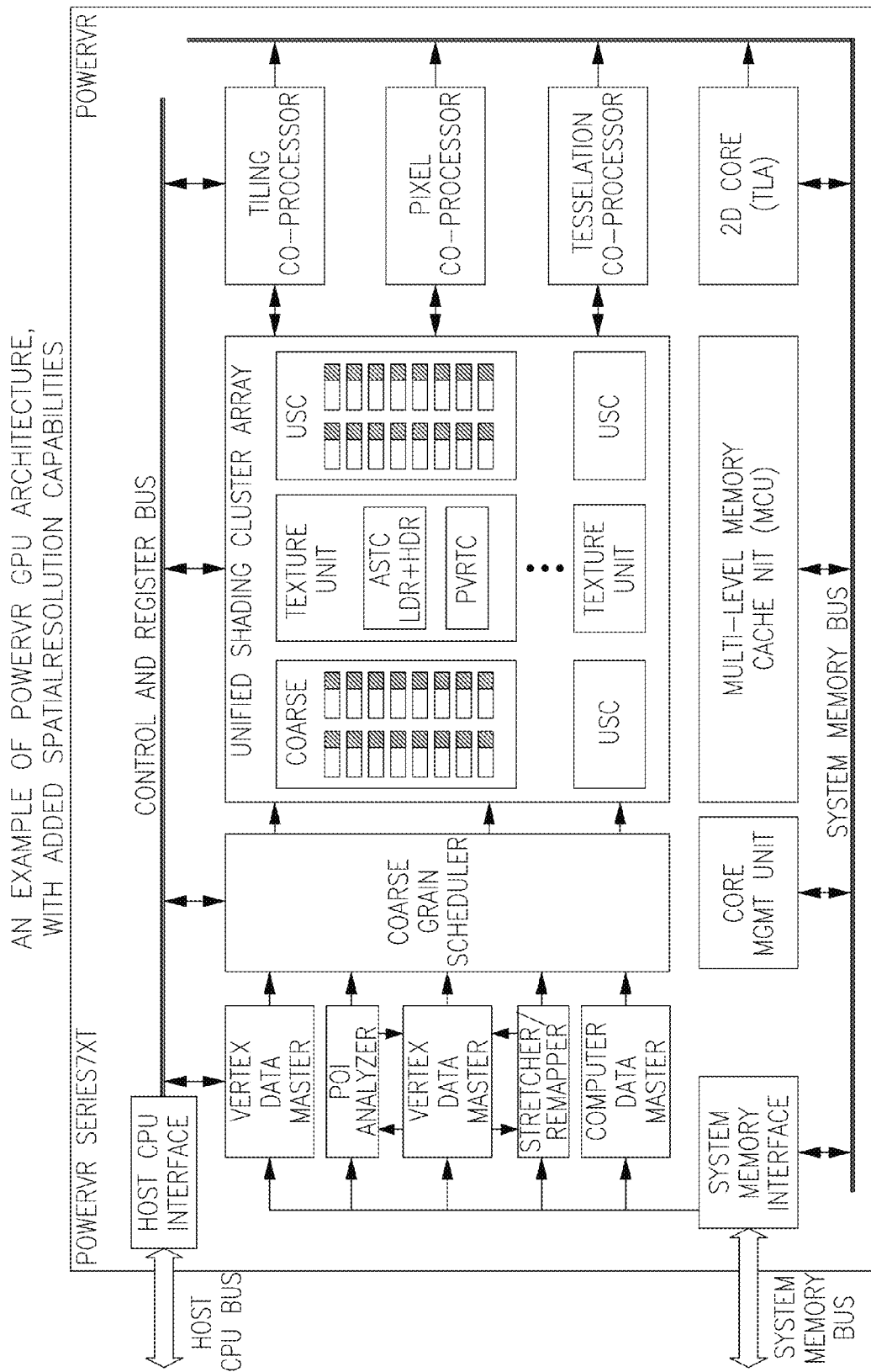
Figure 12D:
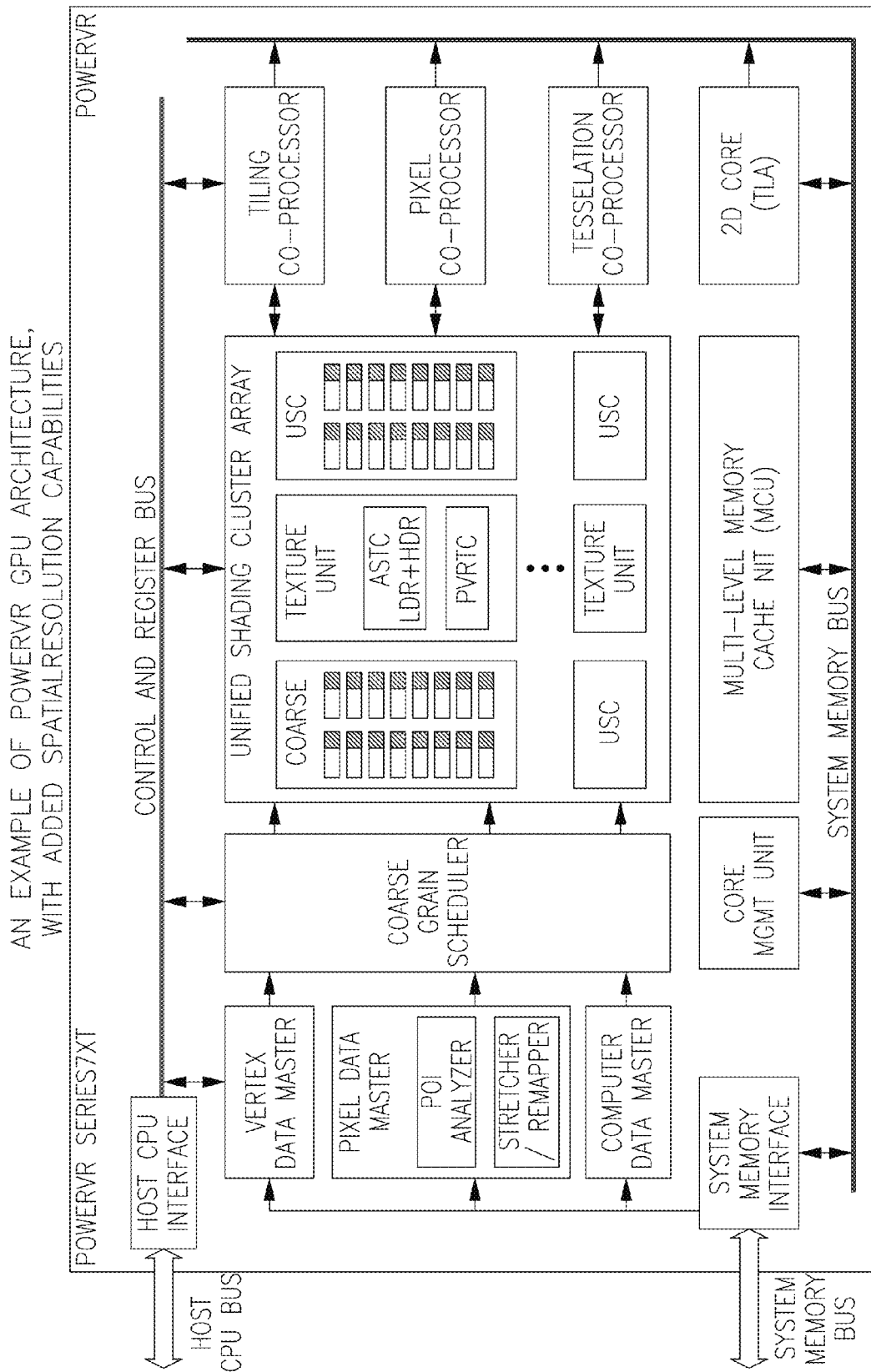
Figure 13A:
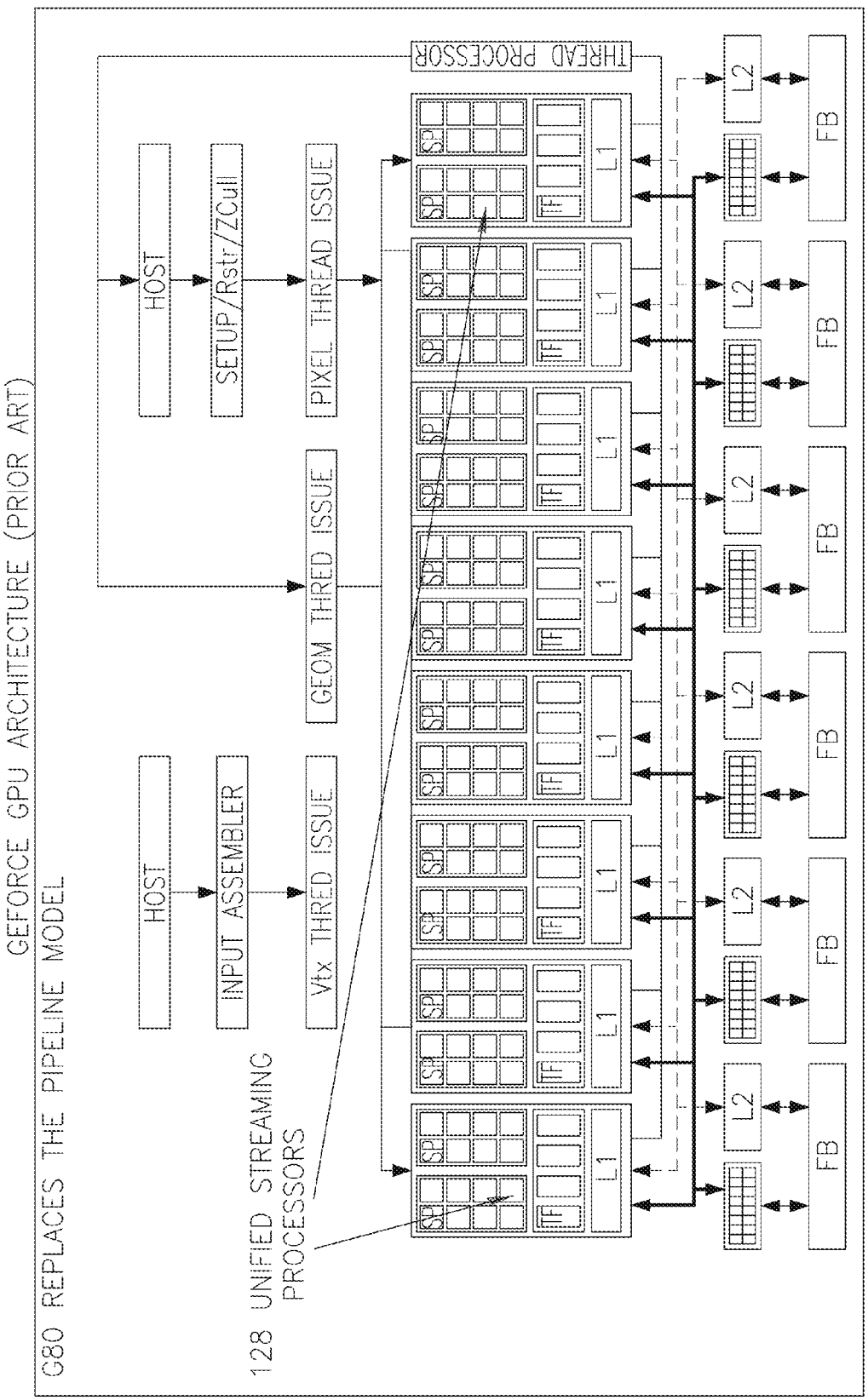

We now will discuss hardware implementations of the present invention through the use of several non-limiting examples. To illustrate how spatial resolution can be added to existing GPU architecture in order to utilize its benefit, FIGS. 11A, 12A and 13A illustrate prior art hardware implementation, and FIGS. 11B-11E, 12B-12D and 13B-13D illustrate exemplary hardware implementation of adding spatial resolution functionality to known hardware structures. It is noted that the actual processing by the POI Analyzer may occur either inside the module itself (most likely with fixed functionality, choosing between few preset modes) and/or by issuing tasks of deciding POI for pixels and/or pixels regions to the shader units. The POI Analyzer module may be a standalone module or it can be positioned with the pixel tasks issuing/processing modules and or inside the rasterizer stage module. Examples of both mobile and desktop domains are provided herein. The technique can be applied to both tile based renderers and non-tile based renderers (tile based renderers are more common on mobile devices).

FIG. 11A illustrates an example of the prior art of Mali GPU architecture, a mobile GPU available from ARM Holdings. FIG. 11B adds a POI Analyzer module as described herein. FIG. 11C adds both a POI Analyzer and a Stretcher/Remapper module. FIG. 11D shows an alternative implementation example in which the Fragment Queue Module includes a POI Analyzer, and FIG. 11E is like FIG. 11D but adds a Stretcher/Remapper added in as well.

FIG. 12A illustrates another example, in a mobile device environment, of the prior art PowerVR GPU architecture, available from Imagination Technologies. FIG. 12B adds a POI Analyzer, and FIG. 12C includes a Stretcher/Remapper module. FIG. 12D schematically illustrates that any of the POI Analyzer and/or Stretcher/Remapper can be contained inside the module responsible for either requesting the cores to process pixel/fragment related tasks or responsible for processing them itself. While not illustrated in the diagram, it is possible to also have the Stretcher/Remapper module as a standalone unit while having the POI Analyzer module being located within the fragment oriented module, and vice versa.

Figure 13B:
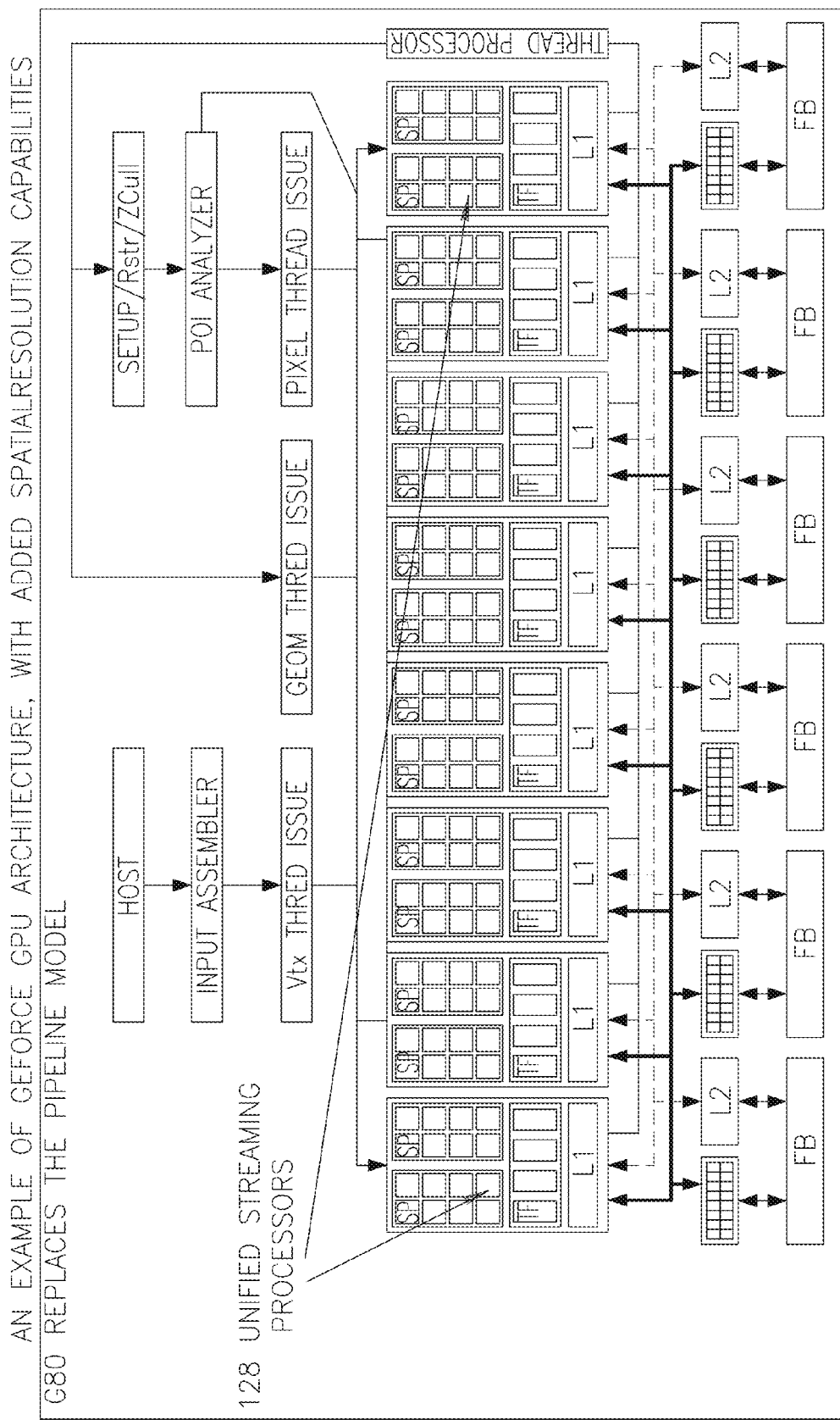
Figure 13C:
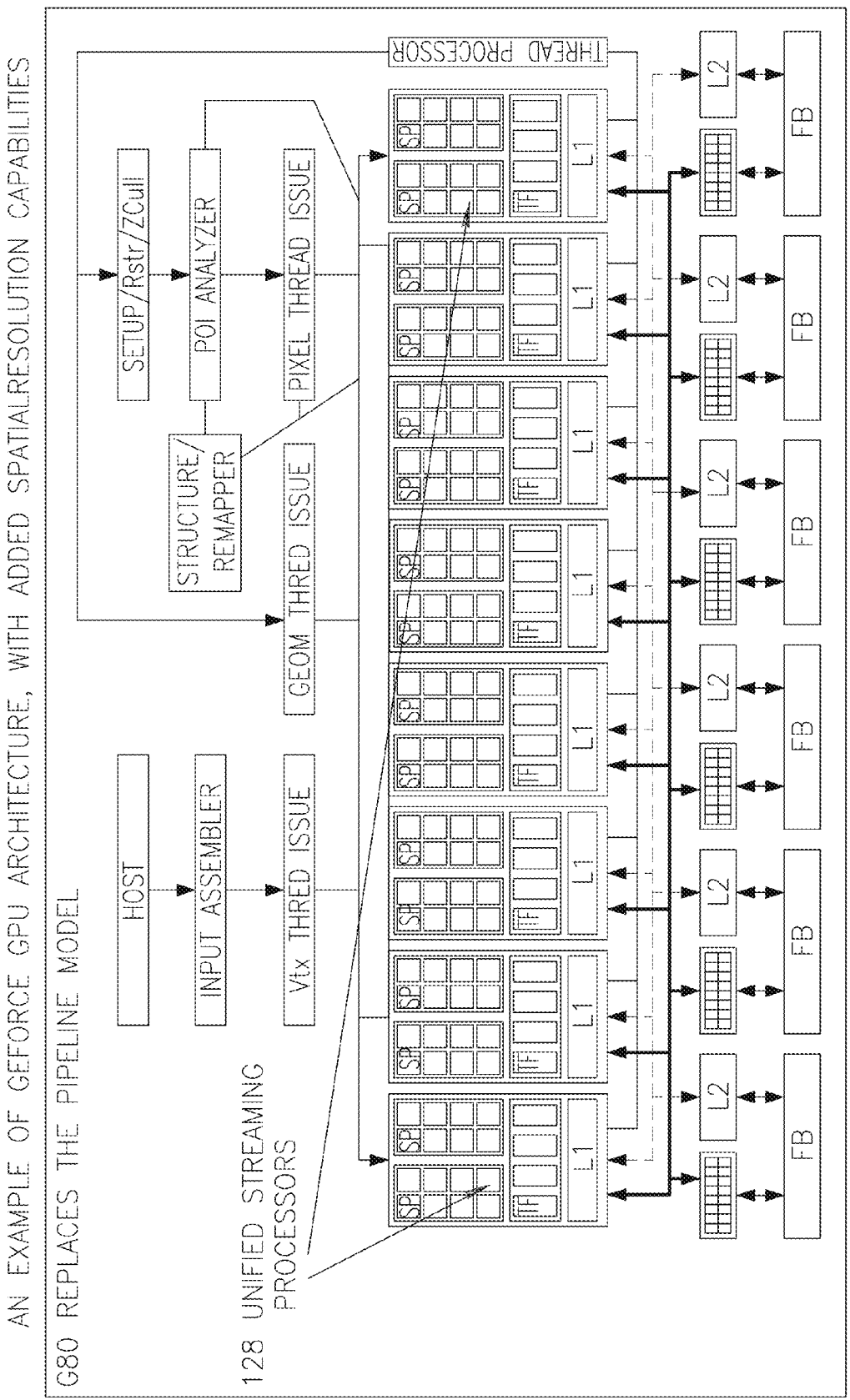
Figure 13D:
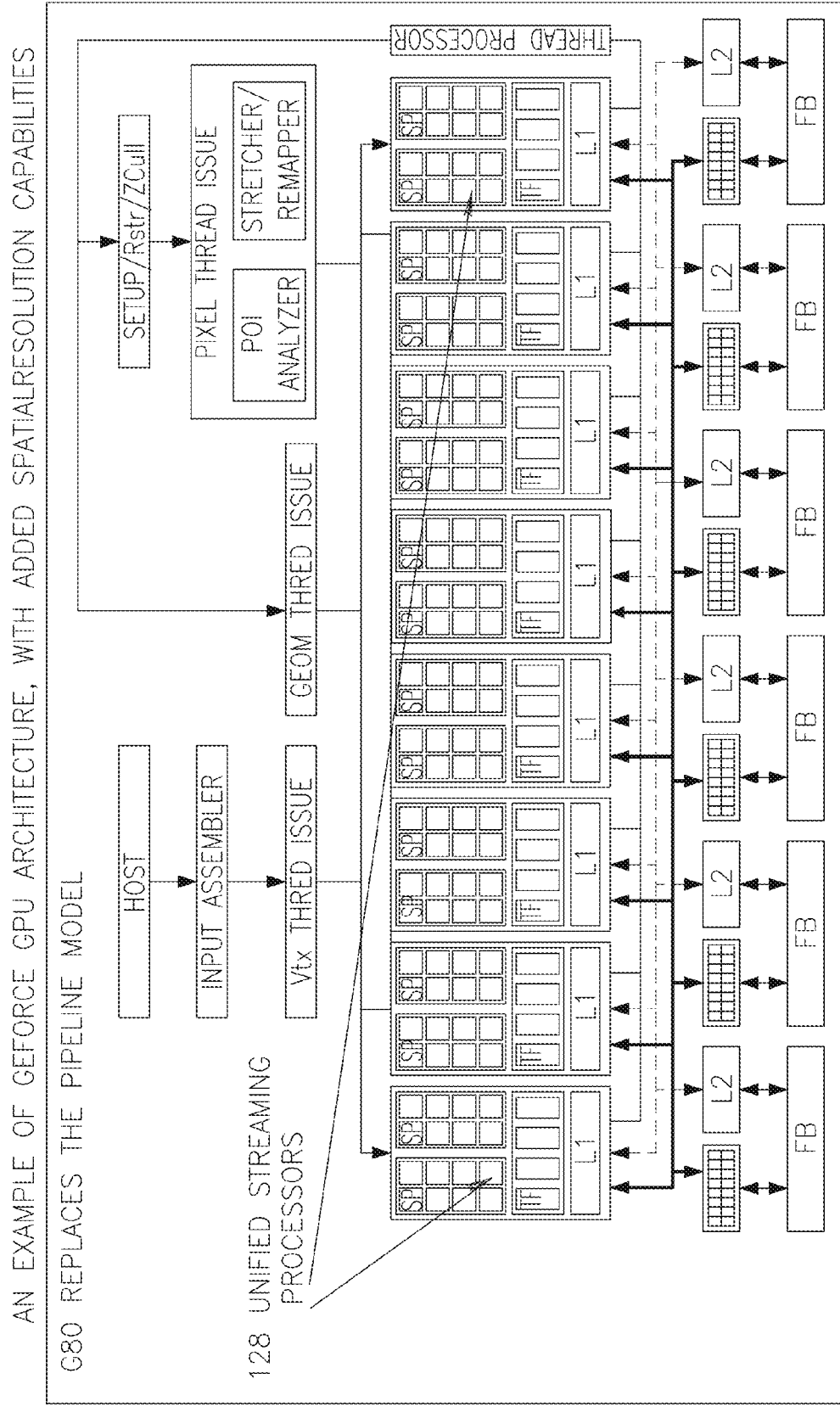

FIG. 13A illustrates one example of the prior art of Geforce GPU, a desktop GPU available from NVidia. FIG. 13B adds a POI Analyzer module, FIG. 13C adds a Stretcher/Remapper module as well. FIG. 13D illustrates that a POI Analyzer module and/or a Stretcher/Remapper module can be contained inside a module responsible for fragment/pixel processing (either issues fragment/pixel processing requests or processes the commands itself).

As mentioned above another aspect of the invention is also generating and enabling a control panel or a user interface which may control the activation or the de-activation or any parameter which is related to the functionality or operation of the spatial resolution system through a native application or through a GPU GUI. Such a control panel or a user interface may include for example the ability for a programmer, developer or an end user of a graphics application to enable or disable a spatial resolution system, to select POI or POI type, selecting the number or ranges of numbers of sampling points, selecting the spatial distribution of the selected sampling points, the number of arrays or sub-arrays of sampling points used and the orientation of any of such an array or a sub-array. Such a control panel or user interface may provide access for controlling other parameters in addition to the spatial resolution parameters. For example, a user may select an anti-aliasing preferred methodology for being practiced with the spatial resolution system. Moreover, such a control panel may provide a user the ability to select any preferred parameter or a set of parameters or a range of allowable parameters which are related to the overall user experience. According to another aspect of the present invention, a spatial resolution system may get inputs from a data collector which collects information related to user experience factors whether as selected by a user or as adjusted by an automatic module on the fly. Such data may be used for optimization a spatial resolution system's parameters based on user's experience factors.

According to another embodiment of the invention disclosed herein, a GPU having a developer or a user interface or a control panel through which a spatial resolution controller may be activated or de-activated. Any spatial resolution controller parameter, as discussed above or any range of parameters, may be defined through dedicated API's by a developer or a user through such an interface. Such a control and customization process may be done by a user or a developer for defining preferences such as, for example, types of POI, number and distribution of sampling points, algorithm selection and operational ranges of such algorithms for recursive sampling, conversion ratio between virtual pixels to rendered pixels or the like. If done by the user, most probably it will be done on a scenario or an application level. If done by a developer, most probably it will be done on a frame level or even on a resource or a group of resources level on the fly by flagging the GPU. Any combination of the two may also be practiced.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the implementations described above can be directed to various combinations and subcombinations of the disclosed features and/or combinations and subcombinations of several further features disclosed above. In addition, the logic flows depicted in the accompanying figures and described herein do not require the particular order shown, or sequential order, to achieve desirable results. Other embodiments may be within the scope of the following claims.

What we claim is:

1. A computer implemented method of producing output pixels for display in a graphics system, the steps comprising: performing rendering operations on one or more pixels, the rendering including the steps of using a Pixel of Interest (POI) Analyzer to determine:
    (a) whether a pixel is a POI or a pixel not of interest (PNOI);
    (b) selecting different resolutions for the POI and for the PNOI;
    wherein the POI Analyzer is one of fixed or programmable;
    wherein, if the POI Analyzer is fixed, one or more parameters from a list of parameters is invoked; and
    if the POI Analyzer is programmable, a pixelresolution-shader is invoked.

2. The computer implemented method of claim 1, wherein the method is performed using a non-transitory computer readable medium storing a program causing a graphics processor unit in the graphics system to execute the steps recited in claim 1.

3. The computer implemented method of claim 1, wherein the method is performed using dedicated computer hardware units.

4. The computer implemented method of claim 1, wherein the steps are performed in a single pass.

5. The computer implemented method of claim 1, wherein the steps are performed in more than one pass.

6. A computer implemented method of producing output pixels for display in a graphics system, the steps comprising: performing rendering operations on one or more pixels, the rendering including the steps of using a Pixel of Interest (POI) Analyzer to determine:
    (a) whether a pixel is a POI or a pixel not of interest (PNOI);
    (b) selecting different resolutions for the POI and for the PNOI;

further comprising performing a stretcher-remapping step after rendering is completed; and wherein the stretcher-remapping step is one of fixed or programmable.

7. The computer implemented method of claim 6, wherein rendering is performed to a buffer in a desired final resolution prior to being displayed.

* * * * *